US012573040B2

(12) United States Patent     (10) Patent No.:   US 12,573,040 B2

Li et al.     (45) Date of Patent:     Mar. 10, 2026

(54) IMAGE PROCESSING APPARATUS AND IMAGE PROCESSING METHOD

(71) Applicant: CANON MEDICAL SYSTEMS CORPORATION, Tochigi (JP)

(72) Inventors: Yufei Li, Beijing (CN); Qi Zhu, Beijing (CN); Gakuto Aoyama, Otawara (JP); Changsheng Qu, Beijing (CN)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 362 days.

(21) Appl. No.: 18/476,399

(22) Filed: Sep. 28, 2023

(65) Prior Publication Data

US 2024/0104732 A1     Mar. 28, 2024

(30) Foreign Application Priority Data

Sep. 28, 2022   (CN) .......................... 202211189171.4
Sep. 25, 2023   (JP) ................................. 2023-160159

(51) Int. Cl.
    *G06T 7/73*        (2017.01)
    *A61B 8/12*        (2006.01)
            (Continued)

(52) U.S. Cl.
    CPC .............. *G06T 7/0012* (2013.01); *G06T 7/11* (2017.01); *G06T 7/174* (2017.01); *G06T 7/50* (2017.01);
            (Continued)

(58) Field of Classification Search
    CPC ......... G06T 7/0012; G06T 7/11; G06T 7/174; G06T 7/50; G06T 7/68; G06T 7/74;
            (Continued)

(56) References Cited

U.S. PATENT DOCUMENTS 10,401,398 B2   9/2019   Shahroudi et al.
10,712,373 B2   7/2020   Shahroudi et al.
(Continued)

FOREIGN PATENT DOCUMENTS

JP     2020-509316 A     3/2020

OTHER PUBLICATIONS

Wein, Wolfgang, et al. "Automatic CT-ultrasound registration for diagnostic imaging and image-guided intervention." Medical image analysis 12.5 (2008): 577-585. (Year: 2008).*

*Primary Examiner* — Andrew M Moyer
*Assistant Examiner* — Dylan John Mendez Muniz
(74) *Attorney, Agent, or Firm* — Oblon, McClelland, Maier & Neustadt, L.L.P.

(57)          ABSTRACT

An image processing apparatus according to an embodiment includes processing circuitry configured: to obtain a medical image to be labeled; to obtain first image data taken by implementing a first imaging method; to specify a feature related to a first organ in the first image data; to receive an imaged range that is in second image data to be taken by implementing a second imaging method and is related to a second organ; to specify a feature related to the imaged range of the second organ corresponding to the imaged range of the second organ in the first image data; and to estimate an imaging parameter that corresponds to the imaged range of the second organ corresponding to the second imaging method, on the basis of the feature related to the first organ and the feature related to the imaged range of the second organ in the first image data.

14 Claims, 13 Drawing Sheets

(51) Int. Cl.

| | |
|---|---|
| *G06T 7/00* | (2017.01) |
| *G06T 7/11* | (2017.01) |
| *G06T 7/174* | (2017.01) |
| *G06T 7/50* | (2017.01) |
| *G06T 7/68* | (2017.01) |

(52) U.S. Cl.
CPC .................. *G06T 7/68* (2017.01); *G06T 7/74* (2017.01); *G06T 2207/10081* (2013.01); *G06T 2207/10132* (2013.01); *G06T 2207/30048* (2013.01)

(58) Field of Classification Search
CPC . G06T 2207/10081; G06T 2207/10132; G06T 2207/30048; G06T 7/73; A61B 6/503; A61B 8/12; A61B 8/5223; A61B 8/0883
See application file for complete search history.

(56) References Cited

U.S. PATENT DOCUMENTS

| | | | |
|---|---|---|---|
| 2011/0071395 A1* | 3/2011 | Miller ................. | G01S 7/52063 |
| | | | 600/440 |
| 2014/0205145 A1* | 7/2014 | Jacobs .................... | G06T 7/248 |
| | | | 382/103 |
| 2018/0252752 A1 | 9/2018 | Shahroudi et al. | |
| 2019/0346490 A1 | 11/2019 | Shahroudi et al. | |
| 2020/0077895 A1* | 3/2020 | Honma .................... | G06T 7/20 |
| 2021/0059634 A1* | 3/2021 | Hamelmann .......... | A61B 8/085 |

* cited by examiner

HEART CT IMAGE

CONVERT BRIGHTNESS VALUES

TRANSESOPHAGEAL ECHOCARDIOGRAPHY
SIMULATION IMAGE

FIG.4

| VIEW NAMES | ANATOMICAL FEATURES | ALGORITHM SEQUENCES |
|---|---|---|
| ME FOUR CHAMBER VIEW | MITRAL CENTER | VENTRICLE SEGMENTATION -> MITRAL SEGMENTATION |
| | LEFT VENTRICLE APEX | VENTRICLE SEGMENTATION -> LEFT VENTRICLE APEX DETECTION |
| | TRICUSPID CENTER | VENTRICLE SEGMENTATION -> TRICUSPID SEGMENTATION |
| ME MITRAL COMMISSURAL VIEW | MITRAL CENTER | VENTRICLE SEGMENTATION -> MITRAL SEGMENTATION |
| | AL COMMISSURAL | |
| | PM COMMISSURAL | |
| DE MITRAL SAX VIEW | SUM OF LEAST SQUARES OF MITRAL VALVE RING | VENTRICLE SEGMENTATION -> MITRAL SEGMENTATION |
| ... | ... | ... |

FIG.5
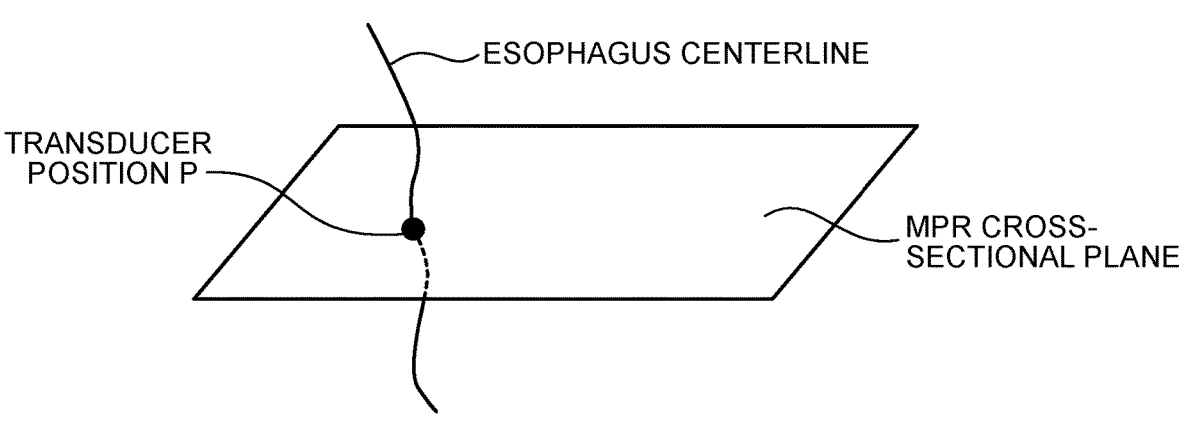
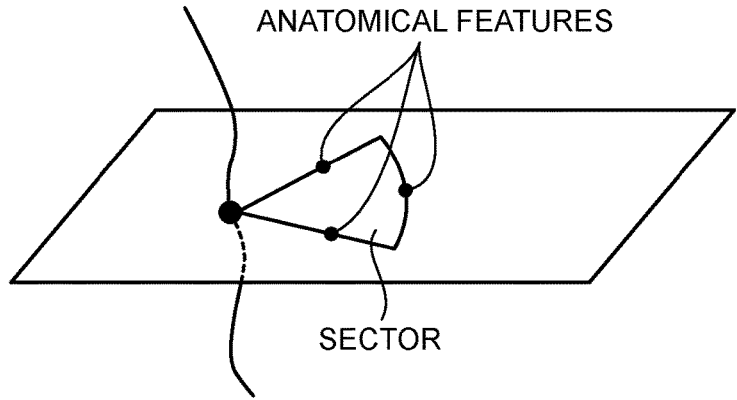
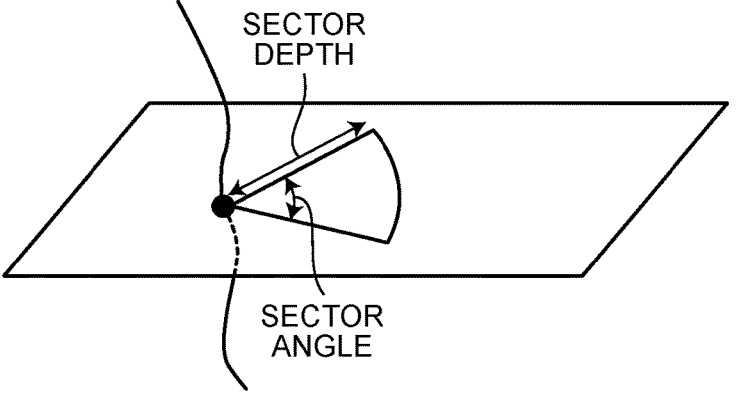

FIG.7

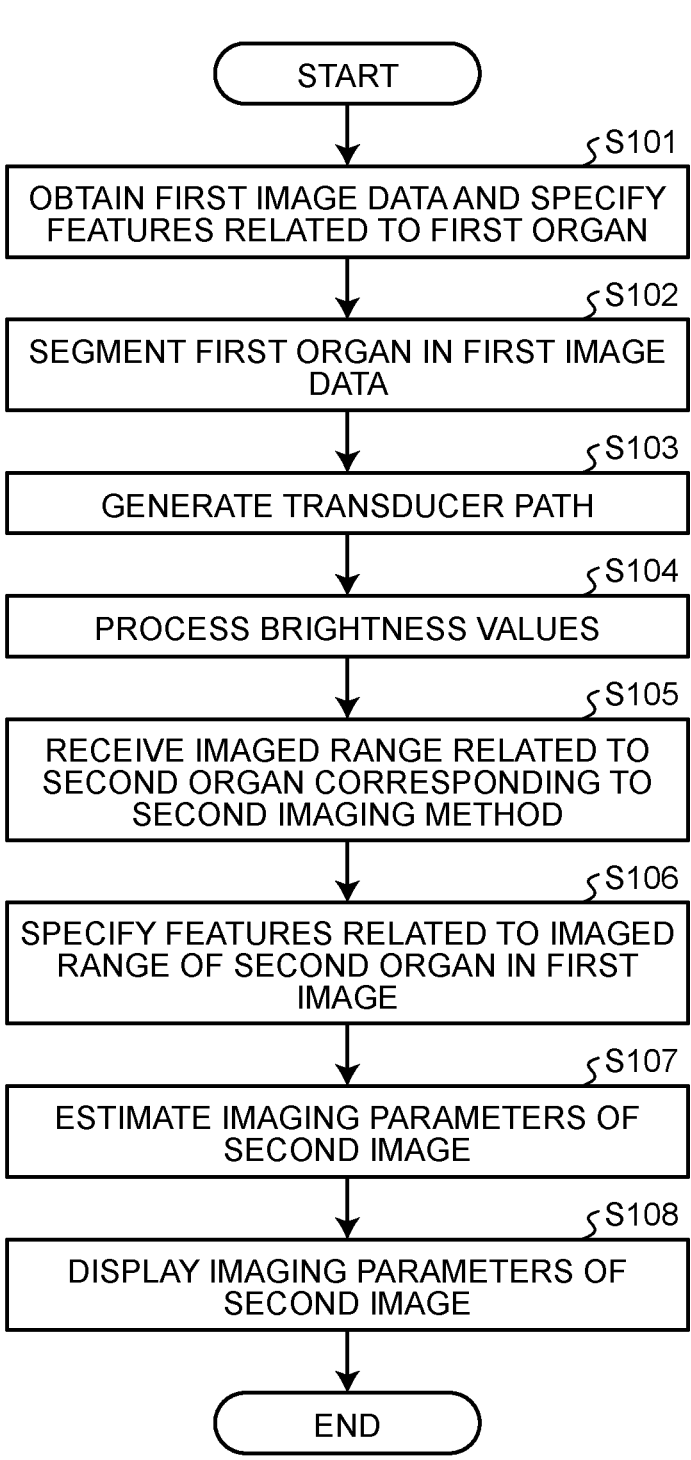

START

S101
OBTAIN FIRST IMAGE DATA AND SPECIFY FEATURES RELATED TO FIRST ORGAN

S102
SEGMENT FIRST ORGAN IN FIRST IMAGE DATA

S103
GENERATE TRANSDUCER PATH

S104
PROCESS BRIGHTNESS VALUES

S105
RECEIVE IMAGED RANGE RELATED TO SECOND ORGAN CORRESPONDING TO SECOND IMAGING METHOD

S106
SPECIFY FEATURES RELATED TO IMAGED RANGE OF SECOND ORGAN IN FIRST IMAGE

S107
ESTIMATE IMAGING PARAMETERS OF SECOND IMAGE

S108
DISPLAY IMAGING PARAMETERS OF SECOND IMAGE

END

TRANSDUCER

CURRENT SECTOR

ESOPHAGUS
CENTERLINE

ESTIMATED
SECTOR

ESOPHAGUS
INNER CONTOUR

DURING-PROCEDURE IMAGE

FIG.11

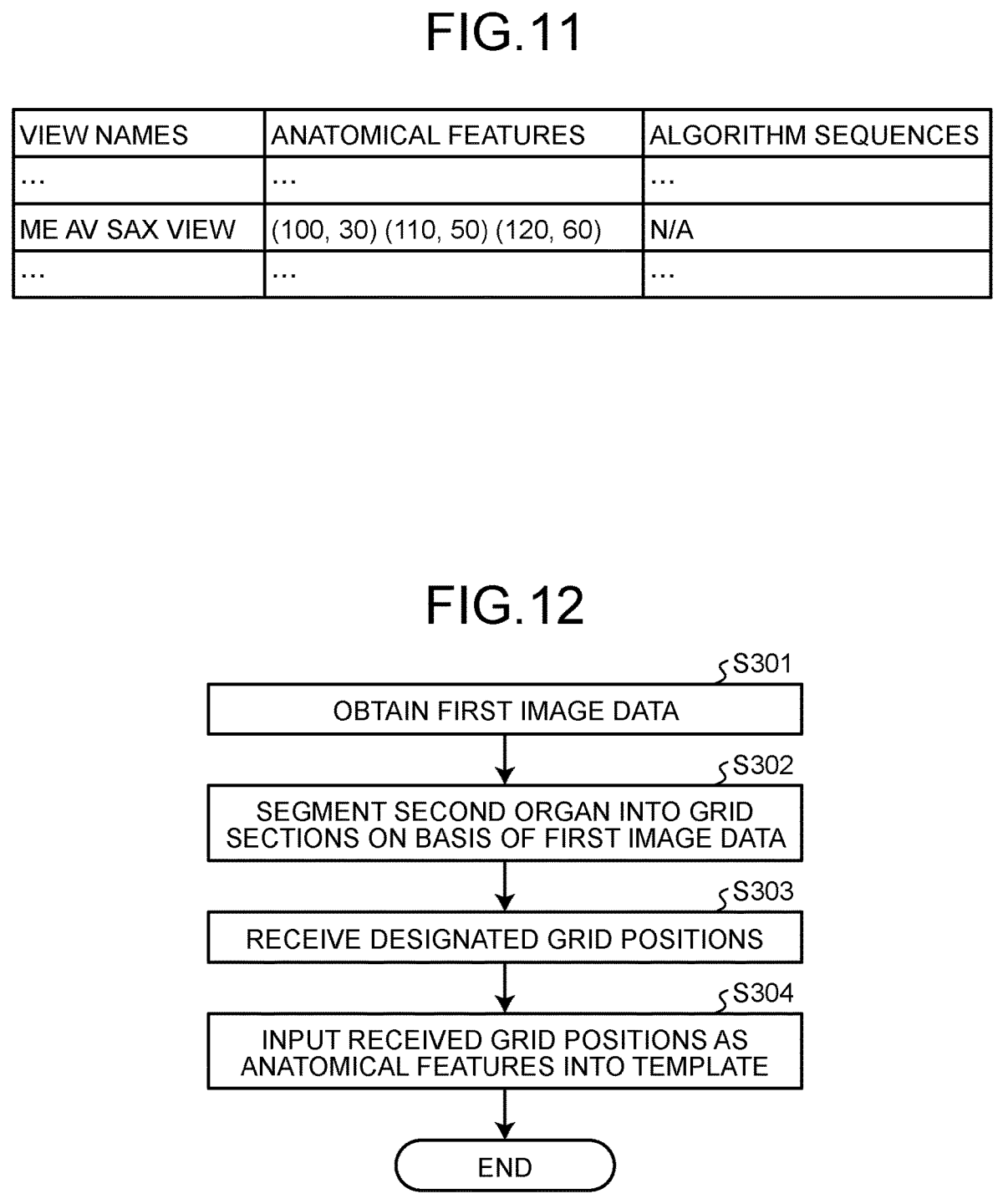

| VIEW NAMES | ANATOMICAL FEATURES | ALGORITHM SEQUENCES |
|---|---|---|
| ... | ... | ... |
| ME AV SAX VIEW | (100, 30) (110, 50) (120, 60) | N/A |
| ... | ... | ... |

OBTAIN FIRST IMAGE DATA

S302

SEGMENT SECOND ORGAN INTO GRID
SECTIONS ON BASIS OF FIRST IMAGE DATA

S303

RECEIVE DESIGNATED GRID POSITIONS

S304

INPUT RECEIVED GRID POSITIONS AS
ANATOMICAL FEATURES INTO TEMPLATE

END

S401
OBTAIN PLURALITY OF VIEW NAMES
FROM TEMPLATE

S402
OBTAIN ANATOMICAL FEATURES BASED
ON ALGORITHM SEQUENCES

S403
GENERATE MPR CROSS-SECTIONAL
PLANES ON BASIS OF ANATOMICAL
FEATURES

S404
ESTIMATE IMAGING PARAMETERS

IMAGE PROCESSING APPARATUS AND IMAGE PROCESSING METHOD

CROSS-REFERENCE TO RELATED APPLICATIONS

This application is based upon and claims the benefit of priority from Chinese Patent Application No. 202211189171.4, filed on Sep. 28, 2022; and Japanese Patent Application No. 2023-160159, filed on Sep. 25, 2023, the entire contents of all of which are incorporated herein by reference.

FIELD

Embodiments described herein relate generally to an image processing apparatus and an image processing method.

BACKGROUND

At present, methods for taking a medical image of an organ of a human body include an imaging method by which the organ is imaged via another organ. For example, ultrasound image diagnosis techniques for the heart include Transesophageal Echocardiography (TEE) techniques. Transesophageal echocardiography is a technique by which an ultrasound probe is put into the esophagus by an operator through the mouth of an examined subject (hereinafter, "patient"), so that an ultrasound image of the heart is obtained via the esophagus. In that situation, because the ultrasound probe is, via the esophagus, positioned adjacent to the heart and the aorta near the heart and is positioned behind the heart, it is possible to obtain a clear ultrasound image of the heart while avoiding impacts from the chest walls and the air inside the lung parts. In this manner, transesophageal echocardiography plays an important role in catheter treatment for widening an artery that has been narrowed by arteriosclerosis, intervention treatment on structural heart diseases, and the like.

In comparison to general Transthoracic Echocardiography (TTE) by which an ultrasound image is obtained as a result of an operator pressing an ultrasound probe against a part of the patient's body surface near the heart, transesophageal echocardiography is an invasive imaging method by which an ultrasound image is obtained by inserting a transducer into the esophagus. To perform transesophageal echocardiography imaging, the operator takes an image by manipulating the transducer positioned inside the esophagus of the patient. However, because the transducer positioned inside the esophagus is not visible, operators having little experience find it very difficult to obtain a cross-sectional image of the heart in an appropriate orientation, by manipulating the transducer positioned inside the esophagus while imagining spatial directions. Further, even experienced operators may find it difficult to obtain an appropriate cross-sectional image due to an abnormal heart structure of the patient or the like. For example, in intervention surgery of the bicuspid valve (which may also be called "the mitral valve"), which is a valve positioned between the left atrium and the left ventricle of the heart, transesophageal echocardiography is used for displaying an appropriate cross-sectional image of the heart as necessary, so as to guide insertion of a catheter into or placement of equipment on the bicuspid. Displaying an appropriate cross-sectional image of the heart in this manner would be difficult when patients suffer from an enlarged atrium.

To cope with this situation, before the operator performs the actual manipulation, it is necessary to estimate (simulate) a medical image (an ultrasound image) to be taken with transesophageal echocardiography and to provide the operator with a plan before a medical procedure (hereinafter, "pre-procedure plan") and guidance before the medical procedure (hereinafter, "pre-procedure guidance") on the basis of a result of the estimation (hereinafter, "estimation result").

However, conventional techniques for estimating a medical image to be taken with transesophageal echocardiography have the following problems.

For example, at the time of estimating a medical image to be taken with transesophageal echocardiography, a magnetic sensor is used for detecting, within a human body model, information such as the position, an inclination angle, and an orientation of a virtual transducer, so as to display the medical image estimated to be obtained with the transesophageal echocardiography, on the basis of the detected information and a heart model specified in advance. In that situation, however, the estimation of the medical image to be taken with the transesophageal echocardiography is carried out on the human body model and the heart model that are specified in advance. When the estimation is carried out, anatomical differences among different patients are not taken into consideration. At the same time, the estimation result cannot be applied during medical procedures. In other words, because the result of estimating the medical image to be taken with the transesophageal echocardiography does not take the differences among different patients into consideration, the precision level of the estimation result is low. For this reason, it is not possible to precisely provide the operator with a pre-procedure plan.

Further, for example, at the time of estimating a medical image to be taken with transesophageal echocardiography, a tomographic image of a tissue of a patient is obtained, so as to generate three-dimensional (3D) volume data on the basis thereof and to estimate the medical image regarding the transesophageal echocardiography. By manually setting a plurality of parameters related to the transesophageal echocardiography, a user is able to estimate a transesophageal echocardiography view to be taken with the transesophageal echocardiography when the set parameters are applied to the patient's 3D volume data and to cause the estimated transesophageal echocardiography view to be displayed. In the estimated transesophageal echocardiography view, it is possible to distinguish different tissues in different colors. In that situation, however, the operator needs to manually search for the necessary transesophageal echocardiography view by setting the plurality of parameters, which takes time and human labor. At the same time, because it is not possible to apply already-specified parameters to a new patient, the manipulation tends to have low efficiency. Furthermore, because the plurality of parameters related to the transesophageal echocardiography that are set by the operator are parameters unique to the transducer, it is difficult to reproduce the parameters during medical procedures. In other words, the estimation of the medical image to be taken with transesophageal echocardiography requires a large amount of human settings made by the operator, takes time and human labor, and has low manipulation efficiency. It has therefore been not possible to efficiently provide the operator with a pre-procedure plan.

In other words, the imaging method by which, via a first organ, a second organ different from the first organ is imaged, has the problem where the manipulation of the operator can be difficult. In addition, there is another problem where, when a pre-procedure plan is provided for the operator by estimating the medical image regarding the imaging method by which the second organ is imaged via the first organ, on the basis of image data from another imaging method, results of the estimation have low precision, and work efficiency at the time of carrying out the estimation is low.

BRIEF DESCRIPTION OF THE DRAWINGS

FIG. 4 is a schematic drawing illustrating an example of a template according to the first embodiment;

FIG. 5 is a schematic drawing illustrating an example of imaging parameters of an estimated sector according to the first embodiment;

FIG. 7 is a flowchart for explaining processes performed by the image processing apparatus according to the first embodiment;

FIG. 11 is a schematic drawing illustrating an example in which anatomical features are received according to the second embodiment;

FIG. 12 is a flowchart for explaining processes performed by the image processing apparatus according to the second embodiment;

DETAILED DESCRIPTION

Figure 1:
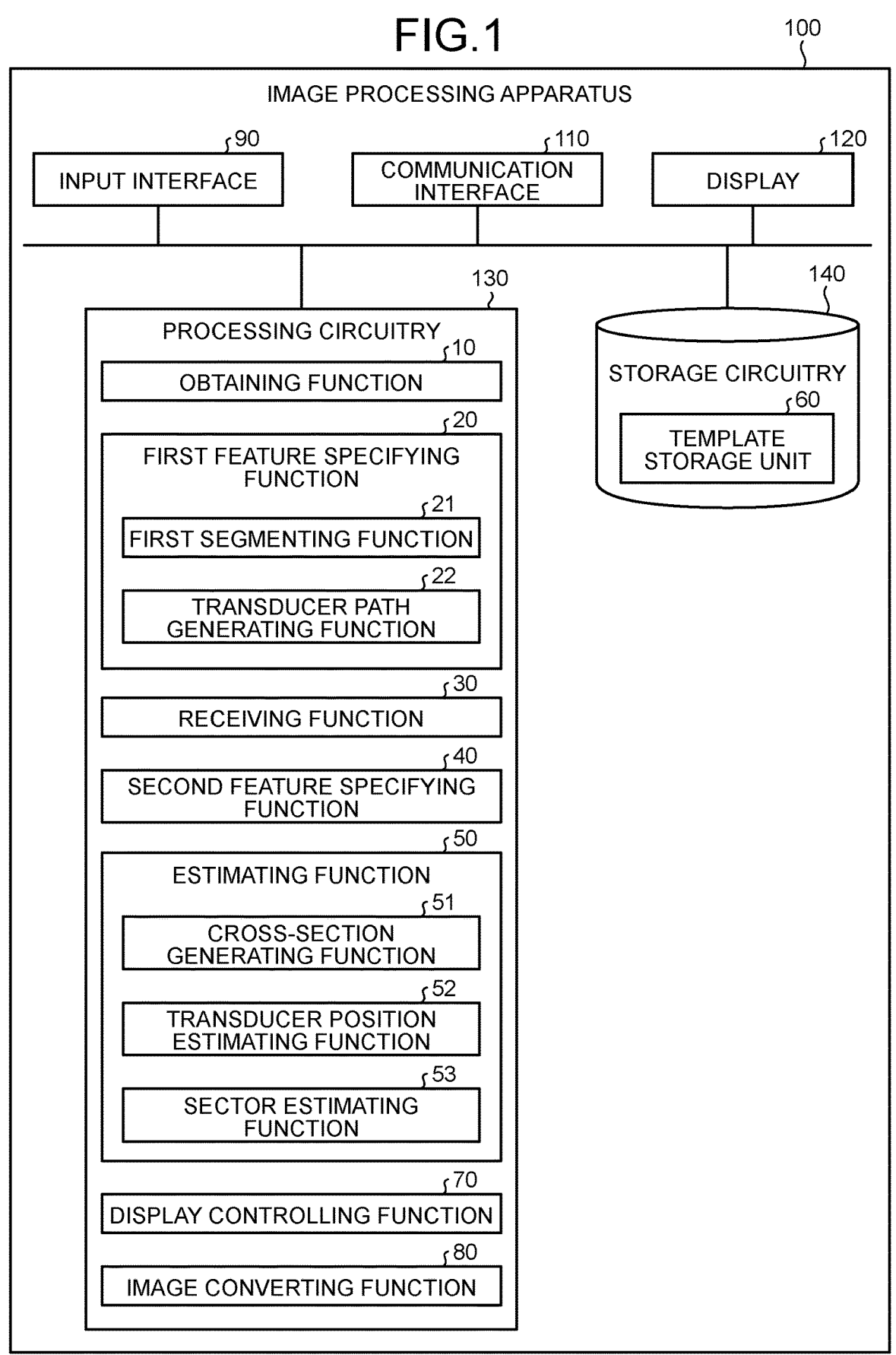
FIG. 1 is a block diagram illustrating an exemplary functional configuration of an image processing apparatus according to a first embodiment.

An image processing apparatus according to an embodiment of the present disclosure includes processing circuitry. The processing circuitry is configured to obtain first image data taken by implementing a first imaging method. The processing circuitry is configured to specify a feature related to a first organ in the first image data. The processing circuitry is configured to receive an imaged range that is in second image data to be taken by implementing a second imaging method different from the first imaging method and is related to a second organ different from the first organ. The processing circuitry is configured to specify a feature related to the imaged range of the second organ in the first image data. The processing circuitry is configured to estimate an imaging parameter that corresponds to the imaged range of the second organ corresponding to the second imaging method, on the basis of the feature related to the first organ and the feature related to the imaged range of the second organ in the first image data.

Exemplary embodiments of an image processing apparatus and an image processing method will be explained in detail below, with reference to the accompanying drawings.

An image processing apparatus according to an embodiment of the present disclosure is structured with a plurality of functional units and is installed, as software, in a piece of equipment including an independent computer, a Central Processing Unit (CPU), and a memory or is individually installed in a plurality of pieces of equipment and is realized as a result of a processing apparatus executing the functional units of the image processing apparatus stored in the memory. Alternatively, the image processing apparatus may be realized with hardware as circuitry capable of executing the functions of the image processing apparatus. The circuitry configured to execute the image processing apparatus is capable of transmitting and receiving data or acquiring data through a cyber element such as the Internet. In yet another example, the image processing apparatus according to the present embodiment may directly be installed in an image acquiring apparatus as a part thereof.

Further, the following will describe an image processing apparatus and an image processing method by using transesophageal echocardiography (TEE) as an example. For instance, the first imaging method may be an imaging method for Computed Tomography (CT) images, whereas the second imaging method may be an imaging method for transesophageal echocardiography. The first image data may represent a CT image of the heart (hereinafter, "heart CT image") of a patient, while the first organ may be the esophagus of the patient. The second image data may represent a medical image obtained by implementing transesophageal echocardiography (i.e., an ultrasound image of the heart of the patient), while the second organ may be the heart of the patient. However, the present embodiment is not limited to these examples and is naturally applicable to image processing apparatuses and image processing methods for other medical images.

First Embodiment

To begin with, a first embodiment will be explained, with reference to FIGS. 1 to 7.

Figure 2:
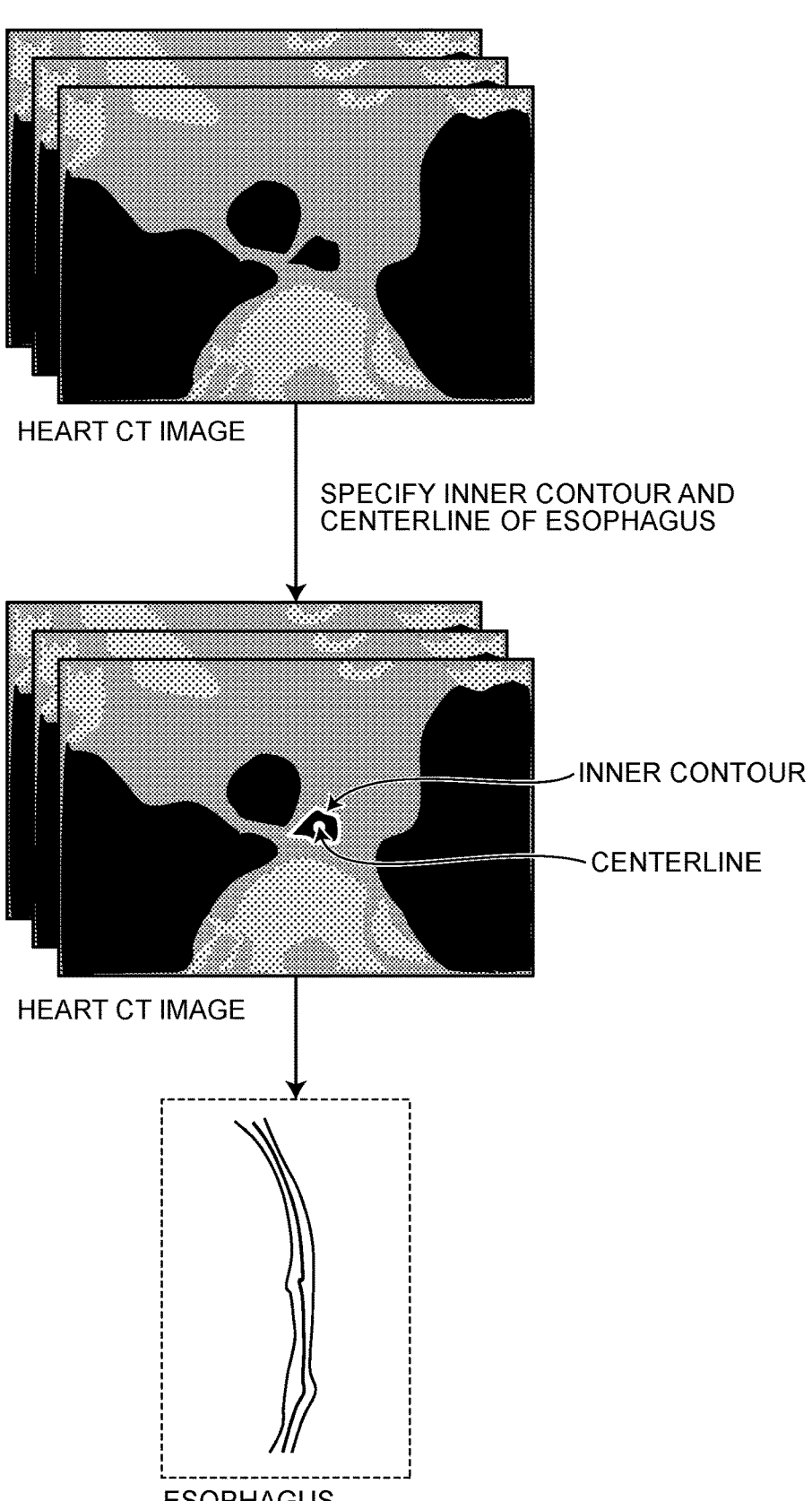
FIG. 2 is a schematic diagram illustrating an example in which features related to a first organ are obtained from first image data according to the first embodiment.
Figure 3:
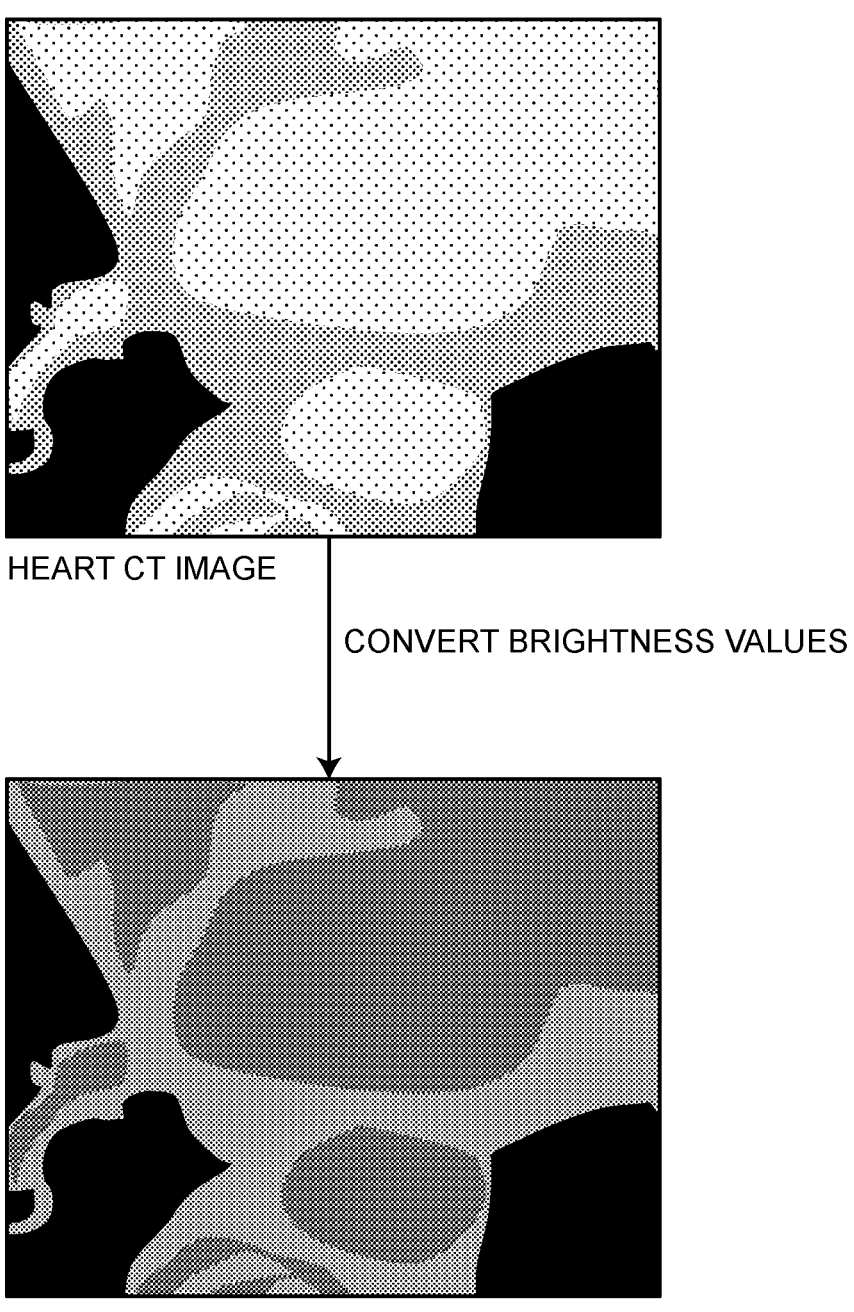
FIG. 3 is a schematic drawing illustrating an example of an image conversion performed on the first image data according to the first embodiment.

FIG. 1 is a block diagram illustrating an exemplary functional configuration of an image processing apparatus according to the first embodiment. FIG. 2 is a schematic diagram illustrating an example in which features related to a first organ are obtained from first image data. FIG. 3 is a schematic drawing illustrating an example of an image conversion performed on the first image data. FIG. 4 is a schematic drawing illustrating an example of a template. FIG. 5 is a schematic drawing illustrating an example of imaging parameters of an estimated sector.

As illustrated in FIG. 1, an image processing apparatus 100 according to the first embodiment includes an input interface 90, a communication interface 110, a display 120, processing circuitry 130, and storage circuitry 140.

The input interface 90 is realized by using a trackball, a switch button, a mouse, a keyboard, a touchpad on which input operations can be performed by touching an operation surface thereof, a touch screen in which a display screen and a touchpad are integrally formed, contactless input circuitry using an optical sensor, audio input circuitry, and/or the like that are used for establishing various settings and the like.

The input interface 90 is connected to the processing circuitry 130 and is configured to convert an input operation received from a user such as a medical doctor into an electrical signal and to output the electrical signal to the processing circuitry 130. Although the input interface 90 is provided inside the image processing apparatus 100 in FIG. 1, the input interface 90 may be provided on the outside.

The communication interface 110 is a Network Interface Card (NIC) or the like and is configured to perform communication with other apparatuses. For example, the communication interface 110 is connected to the processing circuitry 130 and is configured to acquire a medical image from an ultrasound diagnosis apparatus representing an ultrasound system or from an X-ray Computed Tomography (CT) apparatus or a Magnetic Resonance Imaging (MRI) apparatus representing other modalities besides the ultrasound system and to further output the acquired medical image to the processing circuitry 130.

The display 120 is connected to the processing circuitry 130 and is configured to display various types of information and various types of images output from the processing circuitry 130. For example, the display 120 is realized by using a liquid crystal monitor, a Cathode Ray Tube (CRT) monitor, a touch panel, or the like. For example, the display 120 is configured to display a Graphical User Interface (GUI) for receiving instructions from the user, various types of display images, and various types of processing results obtained by the processing circuitry 130. Although the display 120 is provided inside the image processing apparatus 100 in FIG. 1, the display 120 may be provided on the outside. The display 120 is an example of a "display unit".

The storage circuitry 140 is connected to the processing circuitry 130 and is configured to store therein various types of data. More specifically, the storage circuitry 140 is configured to store therein data to be used in processes performed by the proceeding circuitry 130 and data generated in processes performed by the processing circuitry 130. For example, the storage circuitry 140 is configured to store therein, at least, various types of medical images for an image registration purpose, a fusion image obtained after a registration, and the like. For example, the storage circuitry 140 is realized by using a semiconductor memory element such as a Random Access Memory (RAM) or a flash memory, or a hard disk, an optical disk, or the like. Further, the storage circuitry 140 is configured to store therein programs corresponding to processing functions executed by the processing circuitry 130. Although the storage circuitry 140 is provided inside the image processing apparatus 100 in FIG. 1, the storage circuitry 140 may be provided on the outside.

Further, the storage circuitry 140 is configured to store therein a template storage unit 60. Information stored in the template storage unit 60 will be explained later.

For example, the processing circuitry 130 is realized by using a processor. As illustrated in FIG. 1, the processing circuitry 130 includes an obtaining function 10, a first feature specifying function 20, a receiving function 30, a second feature specifying function 40, an estimating function 50, a display controlling function 70, and an image converting function 80. The first feature specifying function 20 includes a first segmenting function 21 and a transducer path generating function 22. The estimating function 50 includes a cross-section generating function 51, a transducer position estimating function 52, and a sector estimating function 53.

In this situation, the processing functions executed by the constituent elements of the processing circuitry 130 illustrated in FIG. 1, namely, the obtaining function 10, the first feature specifying function 20, the receiving function 30, the second feature specifying function 40, the estimating function 50, the display controlling function 70, and the image converting function 80 are recorded in the storage circuitry 140 of the image processing apparatus 100 in the form of computer-executable programs, for example. The processing circuitry 130 is a processor configured to realize the processing functions corresponding to the programs by reading and executing the programs from the storage circuitry 140. In other words, the processing circuitry 130 that has read the programs has the functions illustrated within the processing circuitry 130 in FIG. 1.

The term "processor" used in the above description denotes, for example, a Central Processing Unit (CPU), a Graphics Processing Unit (GPU), or circuitry such as an Application Specific Integrated Circuit (ASIC) or a programmable logic device (e.g., a Simple Programmable Logic Device (SPLD), a Complex Programmable Logic Device (CPLD), or a Field Programmable Gate Array (FPGA)). When the processor is a CPU, for example, the processor is configured to realize the functions by reading and executing the programs saved in the storage circuitry 140. In contrast, when the processor is an ASIC, for example, instead of having the programs saved in the storage circuitry 140, the programs are directly incorporated in the circuitry of the processor. The processors in the present embodiment do not each necessarily have to be structured as one piece of circuitry. It is also acceptable to structure one processor by combining together a plurality of pieces of independent circuitry so as to realize the functions thereof. Furthermore, it is also acceptable to integrate two or more of the constituent elements in FIG. 1 into one processor, so as to realize the functions thereof.

Next, details of processes performed by the obtaining function 10, the first feature specifying function 20, the receiving function 30, the second feature specifying function 40, the estimating function 50, the display controlling function 70, and the image converting function 80 executed by the processing circuitry 130 will be explained.

The obtaining function 10 is configured to obtain the first image data corresponding to the first imaging method. More specifically, the obtaining function 10 is configured to obtain the first image data taken by implementing the first imaging method. In this situation, the obtaining function 10 is an example of an "obtaining unit".

For example, prior to a medical procedure, the obtaining function 10 is configured to obtain a medical image corresponding to one or more cardiac phases taken by a medical image acquiring apparatus carrying out Computed Tomography (CT), Magnetic Resonance (MR) imaging, or Cone Beam CT (CBCT). In the present embodiment, the first imaging method may be a CT image imaging method, for example, whereas the first image data may be a heart CT image of the patient, for example. Through the input interface 90, for example, the obtaining function 10 is configured to obtain, from the outside, a medical image of the heart taken by implementing the CT image imaging method, as the first image data (which hereinafter may be referred to as a "heart CT image") taken by implementing the first imaging method.

The first feature specifying function 20 is configured to specify features related to the first organ in the first image data (the heart CT image). In this situation, the first feature specifying function 20 is an example of a "first feature specifying unit".

In the present embodiment, the first organ may be the esophagus, for example. More specifically, as illustrated in the top section to the middle section of FIG. 2, the first feature specifying function 20 is configured to specify features related to the esophagus in the heart CT image, from the heart CT image obtained by the obtaining function 10. In this situation, the features related to the esophagus may be an inner contour and a centerline of the esophagus, for example. In this situation, as mentioned above, the first feature specifying function 20 includes the first segmenting function 21 and the transducer path generating function 22.

Further, the first segmenting function 21 is configured to segment the esophagus in the heart CT image, on the basis of the features (the inner contour and the centerline of the esophagus) related to the first organ specified from the heart CT image by the first feature specifying function 20. In this situation, the first segmenting function 21 is an example of a "first segmenting unit".

Examples of methods for specifying and segmenting the features related to the esophagus in the heart CT image include publicly-known methods such as those using deep learning, machine learning, and manual segmentation. For example, the esophagus may be segmented in the heart CT image, by implementing a three-dimensional convolution neural network, a random walk technique, classic binarization processing, graph cut processing, or the like. As explained herein, the first segmenting function 21 is configured to segment the esophagus as illustrated in the bottom section of FIG. 2 from the heart CT image, for example, by using a publicly-known method.

The transducer path generating function 22 is configured to generate, in the first image data (the heart CT image), a transducer path for imaging the second organ by implementing the second imaging method, on the basis of the first organ (the esophagus of the patient) segmented by the first segmenting function 21. In this situation, the transducer path generating function 22 is an example of a "transducer path generating unit".

In the present embodiment, the second imaging method may be a transesophageal echocardiography (TEE) imaging method, for example, whereas the second organ may be the heart of the patient. In this situation, the transducer path generating function 22 is configured to generate, in the heart CT image, the path of the transducer for imaging the heart by implementing the transesophageal echocardiography imaging method, on the basis of the features related to the esophagus and having been obtained by the first segmenting function 21. In other words, on the basis of the features related to the esophagus and having been obtained by the first segmenting function 21, the transducer path generating function 22 is configured to generate the path through which the transducer is able to move into the esophagus, as the transducer path.

In this situation, the transducer is a medical mechanism used when the ultrasound system takes a medical image of the patient. The transducer is configured to convert an electrical signal of the ultrasound system into an ultrasound wave. After the ultrasound wave is reflected on the inside of the patient, the transducer is configured to receive a reflected ultrasound wave, to convert the received reflected ultrasound wave into an electrical signal, and to output the electrical signal to the ultrasound system. As a result, the medical image is formed.

The image converting function 80 is configured to process brightness values of the first image data, so as to convert the brightness values corresponding to the first imaging method into brightness values corresponding to the second imaging method. In this situation, the image converting function 80 is an example of an "image converting unit".

In this situation, in the CT image and the ultrasound image, the same tissue is displayed with mutually-different brightness values. For example, due to influence of a contrast agent, the four chambers of the heart (i.e., the right atrium, the right ventricle, the left atrium, and the left ventricle) are displayed with high brightness values in the heart CT image, but are displayed with low brightness values (displayed substantially in black) in the medical image (the ultrasound image) obtained by implementing the transesophageal echocardiography. As illustrated in the top section to the bottom section of FIG. 3, the image converting function 80 is configured to process the brightness values in the heart CT image and to convert the brightness values of organs and tissues corresponding to the CT image imaging method in the heart CT image, into brightness values corresponding to the ultrasound image imaging method for the transesophageal echocardiography. As a result, in the present embodiment, it is possible to estimate (simulate) the medical image (i.e., the ultrasound image) to be taken with the transesophageal echocardiography, by using the heart CT image (i.e., the CT image).

The template storage unit 60 is configured to store therein a template including features related to an imaged range of the second organ in the first image data.

More specifically, as illustrated in FIG. 4, the template storage unit 60 is configured to store therein the template. In this situation, when the template storage unit 60 has stored therein a template of a CT image, the template serves as a template of a medical image to be taken with the transesophageal echocardiography (TEE). For example, when the template storage unit 60 has stored therein a template including the features related to the imaged range of the second organ (the heart of the patient) in the first image data (the heart CT image), the template serves as a template of the medical image (the ultrasound image) obtained by implementing the transesophageal echocardiography. The template includes information indicating view names, information indicating anatomical features, and information indicating algorithm sequences. These pieces of information are kept in correspondence with one another and stored into the template storage unit 60 in advance.

In the example illustrated in FIG. 4, the information indicating the view names indicates view names in the second imaging method (i.e., the transesophageal echocardiography imaging method). For example, in FIG. 4, the view names include: a midoesophageal (ME) four chamber view, an ME Mitral commissural view, and a DE mitral short axis (SAX) view.

The information indicating the anatomical features indicates anatomical features corresponding to the view names. For example, in FIG. 4, the anatomical features include a mitral center, a left ventricle (LV) apex, a tricuspid center, a mitral center, an anterolateral (AL) commissural, a posteromedial (PM) commissural, and the sum of least squares of the mitral valve ring.

The information indicating the algorithm sequences indicates algorithm sequences for extracting the anatomical features. For example, in FIG. 4, the algorithm sequences include: chamber segmentation, mitral segmentation, left ventricle (LV) apex detection, and tricuspid segmentation.

Further, the information indicating the view names, the information indicating the anatomical features, and the information indicating the algorithm sequences are kept in correspondence with one another and are stored in the template storage unit 60 as the template. For example, in FIG. 4, the view name "ME four chamber view" is kept in correspondence with the anatomical features such as the "mitral center", the "left ventricle apex", and the "tricuspid center". Also, the anatomical features the "mitral center", the "left ventricle apex", and the "tricuspid center" are kept in correspondence with the algorithm sequences such as the "ventricle segmentation and mitral segmentation", the "ventricle segmentation and left ventricle apex detection", and the "ventricle segmentation and tricuspid segmentation".

More specifically, for example, in transesophageal echocardiography of which the view name is "ME four chamber view", there are three anatomical features such as the mitral center, the left ventricle apex, and the tricuspid center. With the three anatomical features in the ME four chamber view, namely, the mitral center, the left ventricle apex, and the tricuspid center, three algorithm sequences are kept in correspondence, namely, the ventricle segmentation and mitral segmentation, the ventricle segmentation and left ventricle apex detection, and the ventricle segmentation and tricuspid segmentation, respectively. In this manner, the template has the view names, the anatomical features, and the algorithm sequences kept in correspondence with one another and is stored in the template storage unit 60 in advance.

Further, the information indicating the view names and included in the template corresponds to imaged ranges related to the second organ, i.e., the imaged ranges related to the heart in the transesophageal echocardiography. When the operator is to carry out transesophageal echocardiography imaging on an imaged range of the heart, for example, the operator is able to designate an applicable view name included in the template through the user interface 71 illustrated in FIG. 6. Details of the user interface 71 illustrated in FIG. 6 will be explained later.

Further, the information indicating the anatomical features and included in the template represents the features related to the imaged ranges of the second organ in the first image data, i.e., the features related to the imaged ranges of the heart in the heart CT image. For example, when the operator is to carry out the transesophageal echocardiography on an imaged range of the heart and designates one of the view names through the user interface 71, the template stored in correspondence with the view name includes one or more anatomical features with respect to a transesophageal echocardiography medical image corresponding to the view name. Accordingly, in the present embodiment, it is possible to estimate (simulate), within the heart CT image, the medical image to be taken with the transesophageal echocardiography corresponding to the designated view name, on the basis of the one or more anatomical features. A method for estimating the medical image to be taken with the transesophageal echocardiography corresponding to the designated view name on the basis of the anatomical features will be explained later.

Further, the information indicating the algorithm sequences and included in the template represents the algorithm sequences for segmenting/detecting the anatomical features from the medical image. For example, in the present embodiment, it is possible, in the heart CT image, to segment or detect applicable anatomical features by using any of the algorithm sequences. In other words, in the present embodiment, when an algorithm sequence is executed on the heart CT image on the basis of the template, it is possible to extract (segment/detect) the applicable anatomical features and to estimate (simulate) the medical image to be taken with the transesophageal echocardiography (TEE) corresponding to the view name, by using the anatomical features.

Further, the template stored in the template storage unit 60 may include other features related to the second organ. In that situation, in the present embodiment, by using these features, the medical image resulting from the second imaging method may be estimated, or imaging parameters (explained later) corresponding to the second imaging method may be estimated. For example, the template may be corrected in a self-adaptive manner on the basis of an actual clinical test.

The receiving function 30 is configured to receive an imaged range that is in the second image data to be taken by implementing the second imaging method different from the first imaging method and is related to the second organ different from the first organ. In this situation, the receiving function 30 is an example of a "receiving unit".

As explained above, for example, the first imaging method and the second imaging method are the CT image imaging method and the transesophageal echocardiography imaging method, respectively. The first organ and the second organ are the esophagus of the patient and the heart of the patient, respectively. For example, the operator designates the imaged range related to the heart in the transesophageal echocardiography, by using the user interface 71 (explained later). More specifically, from a list displayed by the user interface 71 (explained later), the operator selects one of the view names (e.g., the ME four chamber view, the ME mitral commissural view, or the DE mitral SAX view) corresponding to the imaged range of the heart in the transesophageal echocardiography image to be taken. In this manner, the receiving function 30 is configured to receive the imaged range designated by the operator through the user interface 71 (explained alter), as the imaged range related to the second organ corresponding to the second imaging method.

The second feature specifying function 40 is configured to specify features related to the imaged range of the second organ (the heart of the patient) in the first image data (the heart CT image). In this situation, the second feature specifying function 40 is an example of a "second feature specifying unit".

For example, the operator selects one of the view names through the user interface 71 (explained later), so that the receiving function 30 receives the designated imaged range related to the heart of the patient in the transesophageal echocardiography. Accordingly, on the basis of the imaged range of the second organ (the heart of the patient) received by the receiving function 30, the second feature specifying function 40 is configured to specify the features related to the imaged range of the heart of the patient, from the template stored in the template storage unit 60. For example, on the basis of a correspondence relationship between the view name and the anatomical features in the template, the second feature specifying function 40 is configured to specify the anatomical features related to the heart with respect to the imaged range of the heart in the heart CT image. This process is performed for the purpose of estimating (simulating) the medical image to be taken with the transesophageal echocardiography. In addition, on the basis of the correspondence relationship between the view name and the algorithm sequences in the template, the second feature specifying function 40 is configured to specify the algorithm sequences corresponding to the anatomical features related to the imaged range of the heart in the heart CT image. This process is performed for the purpose of extracting (segmenting/detecting) the anatomical features from the heart CT image.

On the basis of the features (the inner contour and the centerline) related to the first organ (the esophagus of the patient) in the first image data (the heart CT image) and the features related to the imaged range of the second organ (the heart of the patient), the estimating function 50 is configured to estimate the imaging parameters to be used at the time of imaging the imaged range of the second organ by implementing the second imaging method. In this situation, the estimating function 50 is an example of an "estimating unit".

The imaging parameters include a transducer position, as well as a depth and an angle of a sector for specifying the imaged range of the second organ (the heart of the patient) in the second imaging method (the transesophageal echocardiography imaging method). In other words, the estimating function 50 is configured to estimate the transducer position and the depth and the angle of the sector.

In this situation, as mentioned above, the estimating function 50 includes the cross-section generating function 51, the transducer position estimating function 52, and the sector estimating function 53.

To begin with, on the basis of the features related to the imaged range of the second organ (the heart of the patient) and specified by the second feature specifying function 40, the cross-section generating function 51 is configured to generate a first cross-sectional plane corresponding to the imaged range related to the second organ. In this situation, the cross-section generating function 51 is an example of a "cross-section generating unit".

For example, let us discuss a situation in which the operator has designated one of the view names through the user interface 71 (explained later). In that situation, the cross-section generating function 51 is configured to specify the anatomical features in the first image data (the heart CT image), on the basis of the algorithm sequences for extracting the anatomical features corresponding to the view name, as the features related to the imaged range of the second organ (the heart of the patient) specified by the second feature specifying function 40. Subsequently, on the basis of the anatomical features, the cross-section generating function 51 is configured to generate a Multi Planar Reconstruction (MPR) cross-sectional plane corresponding to the view name. In this situation, the MPR cross-sectional plane is an example of a "first cross-sectional plane".

In this situation, the MPR cross-sectional plane denotes, for example, a cross-sectional plane used at the time of estimating (simulating) the medical image to be taken with the transesophageal echocardiography, by using the heart CT image. After the operator designates the view name through the user interface 71 (explained later), the receiving function 30 is configured to receive the imaged range related to the heart in the transesophageal echocardiography corresponding to the designated view name. In that situation, the second feature specifying function 40 is configured to specify, from the template stored in the template storage unit 60, anatomical features as the features related to the imaged range of the heart in the heart CT image, as well as algorithm sequences for extracting the anatomical features. Subsequently, the cross-section generating function 51 is configured to extract (segment/detect) the anatomical features from the heart CT image by using the specified algorithm sequences and to further generate the MPR cross-sectional plane on the basis of the extracted anatomical features. Because the image converting function 80 converts the brightness values in the heart CT image into the brightness values corresponding to the transesophageal echocardiography, the MPR cross-sectional plane generated by the cross-section generating function 51 is to be used for estimating the medical image to be taken with the transesophageal echocardiography corresponding to the designated view name. For example, when the anatomical features are three feature points, a plane including the three feature points and having been generated by the cross-section generating function 51 is an MPR cross-sectional plane.

After that, the transducer position estimating function 52 is configured to estimate a transducer position, on the basis of the features related to the first organ and specified by the first feature specifying function 20 and the first cross-sectional plane generated by the cross-section generating function 51. In this situation, the transducer position estimating function 52 is an example of a "transducer position estimating unit".

More specifically, as explained above, the first organ is the esophagus of the patient, while the features related to the first organ include the inner contour and the centerline of the esophagus, and the first cross-sectional plane is the MPR cross-sectional plane. For example, as illustrated in the top section of FIG. 5, the transducer position estimating function 52 is configured to estimate the intersection point between the centerline of the esophagus specified by the first feature specifying function 20 and the MPR cross-sectional plane generated by the cross-section generating function 51, as the position of the transducer (hereinafter, "transducer position P"). In this situation, the transducer position P is an example of an "imaging parameter".

Subsequently, on the basis of the features related to the imaged range of the second organ (the heart of the patient), the sector estimating function 53 is configured to estimate a depth and an angle of a sector for specifying the imaged range of the heart of the patient in the transesophageal echocardiography imaging method, at the transducer position P on the first cross-sectional plane (MPR cross-sectional plane). In this situation, the sector estimating function 53 is an example of a "sector estimating unit". The depth and the angle of the sector are examples of the "imaging parameter".

For example, as illustrated in the middle section to the bottom section of FIG. 5, as the features related to the imaged range of the second organ (the heart of the patient), the sector estimating function 53 is configured to estimate, on the basis of the anatomical features, the depth and the angle of the sector in such a manner that the sector includes all the anatomical features while the area of the sector is minimized.

More specifically, the sector estimating function 53 is configured to estimate the depth and the angle of the sector to be used at the time of carrying out transesophageal echocardiography imaging. In that situation, in an actual transesophageal echocardiography imaging process, the smaller the area of the sector is, the higher is the image quality. Conversely, the larger the area of the sector is, the lower is the image quality. Further, a required condition is to set the depth and the angle of the sector so that it is possible to image the anatomical features specified by the second feature specifying function 40. In this situation, the sector estimating function 53 uses, in an example, a scheme of a loss mathematical function (hereinafter, "loss function") or the like. The loss function expresses an error between a "goal" and an "actual" output. For example, at the time of determining optimal parameters for the purpose of carrying out an accurate conjecture in a neural network, the "loss function" can serve as an index for approximating parameters to the optimal parameters. Accordingly, by using a scheme such as the loss function, the sector estimating function 53 is configured to specify the depth and the angle that minimize the area of the sector satisfying the abovementioned condition, at the transducer position P on the MPR cross-sectional plane, as the depth and the angle of the sector, respectively.

As explained above, on the basis of the centerline of the esophagus in the heart CT image and the MPR cross-sectional plane corresponding to the imaged range of the heart, the transducer position estimating function 52 is configured to estimate the transducer position P in the transesophageal echocardiography. In addition, the sector estimating function 53 is configured to estimate the depth and the angle of the sector in the transesophageal echocardiography, on the basis of the anatomical features related to the heart in the heart CT image.

In other words, on the basis of the features related to the esophagus and the features related to the imaged range of the heart in the heart CT image, the estimating function 50 is configured to estimate the transducer position P and the depth and the angle of the sector corresponding to the imaged range of the heart in the transesophageal echocardiography imaging method.

Next, processes performed in the present embodiment will be explained with specific examples.

For instance, as explained above, the receiving function 30 is configured to receive an imaged range of the second organ (the heart of the patient) different from the first organ (the esophagus of the patient) in the second image data (the ultrasound image) to be taken by implementing the second imaging method (the transesophageal echocardiography imaging method) different from the first imaging method (the CT image imaging method). More specifically, when the operator is to take an ME four chamber view by implementing the transesophageal echocardiography imaging method, the operator designates the "ME four chamber view" through the user interface 71 (explained later), as the imaged range related to the heart in the transesophageal echocardiography imaging method. In this situation, the receiving function 30 receives the designated "ME four chamber view".

Further, in the template stored in the template storage unit 60, the ME four chamber view corresponds to each of the three anatomical features, namely, the mitral center, the left ventricle apex, and the tricuspid center. Further, the mitral center, the left ventricle apex, and the tricuspid center correspond to the three algorithm sequences, namely, the ventricle segmentation and mitral segmentation, the ventricle segmentation and left ventricle apex detection, and the ventricle segmentation and tricuspid segmentation, respectively. Accordingly, as the features related to the heart in the heart CT image, the second feature specifying function 40 is configured to specify the anatomical features corresponding to the ME four chamber view (i.e., the mitral center, the left ventricle apex, and the tricuspid center) and the algorithm sequences (i.e., the ventricle segmentation and mitral segmentation, the ventricle segmentation and left ventricle apex detection, and the ventricle segmentation and tricuspid segmentation).

Subsequently, on the basis of the algorithm sequences (i.e., the ventricle segmentation and mitral segmentation, the ventricle segmentation and left ventricle apex detection, and the ventricle segmentation and tricuspid segmentation) obtained by the second feature specifying function 40, the cross-section generating function 51 of the estimating function 50 extracts (segments/detects) the anatomical features (i.e., the mitral center, the left ventricle apex, and the tricuspid center) from the heart CT image. Further, the cross-section generating function 51 generates an MPR cross-sectional plane corresponding to the ME four chamber view by using these anatomical features. In this situation, because all the anatomical features are each a feature point, the MPR cross-sectional plane is generated so as to include the three feature points. In the present example, although the MPR cross-sectional plane is a plane specified in the heart CT image on the basis of the abovementioned anatomical features, the image converting function 80 is configured to convert the brightness values in the heart CT image into the brightness values corresponding to the transesophageal echocardiography. Accordingly, the generated MPR cross-sectional plane is to be used for estimating a medical image of a ME four chamber view to be taken with the transesophageal echocardiography.

After that, the transducer position estimating function 52 of the estimating function 50 estimates the intersection point between the centerline of the esophagus specified by the first feature specifying function 20 and the MPR cross-sectional plane generated by the cross-section generating function 51, as the transducer position P. In this situation, due to the structure of the human body, an inappropriate depth and/or an inappropriate angle of the sector may be estimated. For example, the inappropriateness may be calculated from a result of extracting the esophagus and the size of the transducer. In an inappropriate example, the transducer position may be estimated as a position penetrating through the esophagus. In another example, the estimated depth or the estimated angle may exceed a structural movable range of the transducer. In those situations, the sector estimating function 53 is configured to issue an alert. Alternatively, instead of estimating a position corresponding to an inappropriate depth or angle of the sector or to a depth or angle exceeding the structural movable range of the transducer, the sector estimating function 53 may estimate a position closest to such a position.

Subsequently, the sector estimating function 53 of the estimating function 50 estimates a depth and an angle of a sector so as to be able to image the anatomical features (i.e., the mitral center, the left ventricle apex, and the tricuspid center) specified by the second feature specifying function 40.

As explained above, the estimating function 50 is configured to estimate the transducer position P and the depth and the angle of the sector, as the imaging parameters for the transesophageal echocardiography imaging method at the time of imaging the ME four chamber view of the heart.

Figure 6:
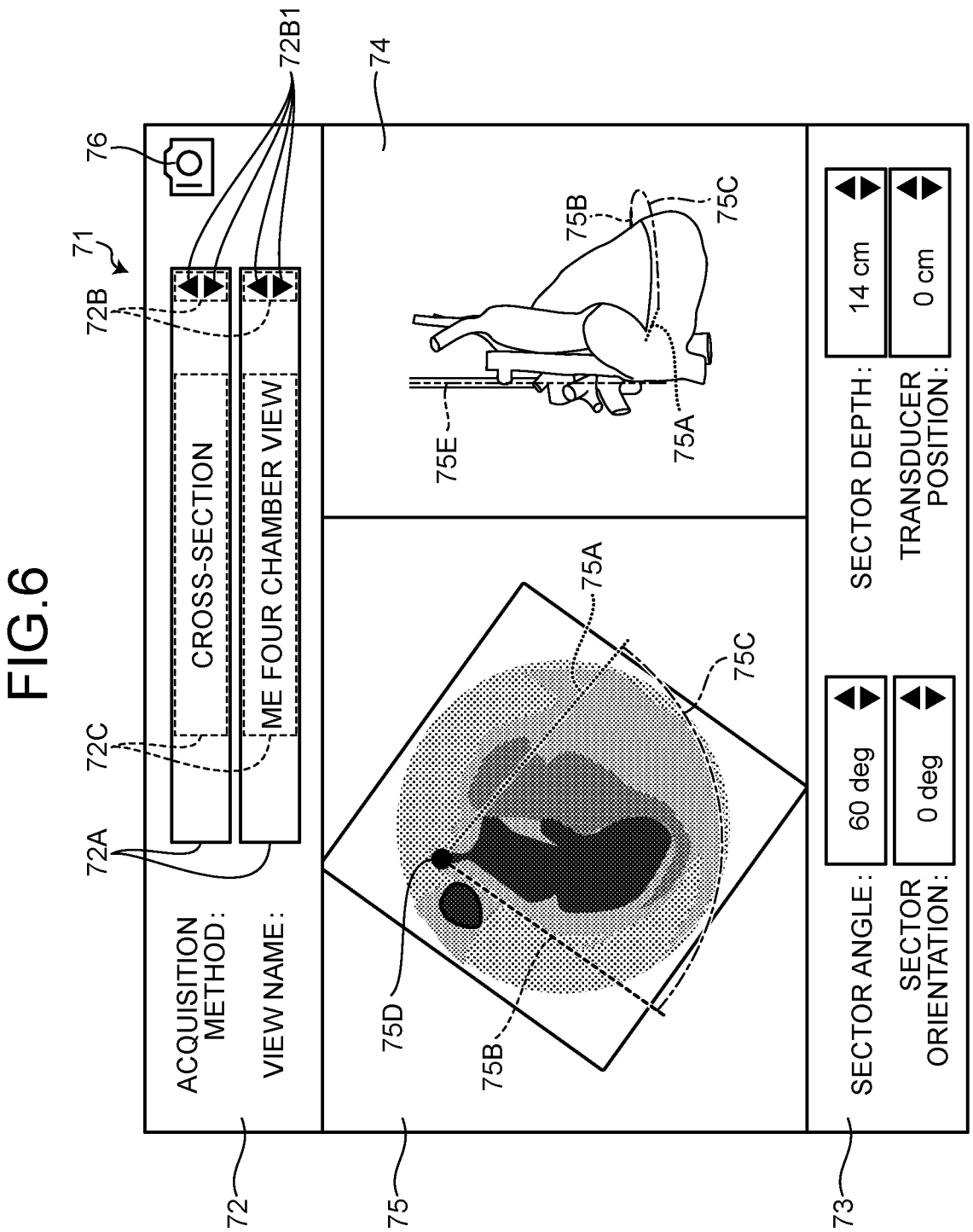
FIG. 6 is a schematic drawing illustrating an example of a user interface according to the first embodiment.

In the following sections, the display controlling function 70 and the user interface 71 will be explained, with reference to FIG. 6. FIG. 6 is a schematic drawing illustrating an example of the user interface 71.

The display controlling function 70 is configured to cause the display 120 to display the user interface 71. The user interface 71 is used for prompting the operator to confirm or adjust the imaging parameters that are for imaging the imaged range related to the second organ by implementing the second imaging method and were estimated by the estimating function 50.

In the example in FIG. 6, the user interface 71 includes a display region 72 positioned in an upper section, a display region 73 positioned in a lower section, a display region 74 positioned in a right section, and a display region 75 positioned in a left section. The display regions 74 and 75 are positioned between the display region 72 and the display region 73.

On the user interface 71, displayed in the display region 74 indicated in the right section of FIG. 6 is, for example, a heart model generated on the basis of the heart CT image obtained by the obtaining function 10. In positions corresponding to the heart model displayed in the display region 74, for example, the inner contour and the centerline of the esophagus specified by the first feature specifying function 20 may be displayed. Further, in a position corresponding to the heart model displayed in the display region 74, for example, a virtual sector of the esophagus corresponding to the transducer position P may be displayed on the basis of the transducer position P estimated by the transducer position estimating function 52 and the depth and the angle of the sector estimated by the sector estimating function 53.

Further, on the user interface 71, displayed in the display region 72 indicated in the upper section of FIG. 6 are, for example, display sections 72A for an acquisition method and a view name. For example, displayed in right end parts 72B of the display sections 72A are buttons 72B1 used by the operator for selecting an acquisition method and a view name. Displayed in central parts 72C of the display sections 72A are the acquisition method and the view name selected by the operator. In the example illustrated in FIG. 6, displayed in the display region 72 are the acquisition method "cross-section" and the view name "ME four chamber view" selected by the operator.

Further, on the user interface 71, displayed in the display region 75 indicated in the left section of FIG. 6 is, for example, the MPR cross-sectional plane generated by the cross-section generating function 51. Further, displayed in the display region 74 are the transducer position P estimated by the transducer position estimating function 52 and the sector of which the depth and the angle were estimated by the sector estimating function 53.

Further, on the user interface 71, displayed in the display region 73 indicated in the lower section of FIG. 6 are display sections for the imaging parameters that correspond to the imaged range of the second organ (the heart of the patient) in the second imaging method (the transesophageal echocardiography imaging method) and were estimated by the sector estimating function 53. In other words, displayed in the display region 73 are the display sections for the imaging parameters such as the depth and the angle of the sector and the transducer position. For example, displayed in the display region 73 are the display sections for the imaging parameters such as a sector angle, a sector depth, a sector orientation, and the transducer position. Displayed on the right-hand side of the display sections are buttons used by the operator for adjusting the sector angle, the sector depth, the sector orientation, and the transducer position. Displayed in the central parts of the display sections are the sector angle, the sector depth, the sector orientation, and the transducer position selected by the operator. In this situation, the parameters such as the sector angle, the sector depth, the sector orientation, and the transducer position are changeable (adjustable) by the operator. For example, when the operator has changed (adjusted) any of the parameters such as the sector angle, the sector depth, the sector orientation, and/or the transducer position, the one or more parameters adjusted by the operator are displayed on the user interface 71. In the example in FIG. 6, displayed in the display region 73 are: a sector angle "60 deg", a sector depth "14 cm", a sector orientation "0 deg", and a transducer position "0 cm" adjusted by the operator.

Further, the user interface 71 may display two radii of the sector in the transesophageal echocardiography displayed in the display region 75 so as to be recognizable by the operator. For example, in the display region 75, the two radii of the sector in the transesophageal echocardiography are displayed with a red line 75A (the dotted line in FIG. 6) and with a green line 75B (the broken line in FIG. 6), while an arc line connecting the two radii together is displayed with a white line 75C (the dashed chain line in FIG. 6). Further, in the display region 74, by using the heart model, the two radii of the sector are displayed with a red line 75A (the dotted line in FIG. 6) and with a green line 75B (the broken line in FIG. 6), while an arc line connecting the two radii together is displayed with a white line 75C (the dashed chain line in FIG. 6). As explained herein, because the display regions 74 and 75 of the user interface 71 display the two radii of the sector in the transesophageal echocardiography and the arc line connecting the two radii together, the operator is able to more easily understand the sector orientation with respect to the patient.

Further, the user interface 71 may display the transducer position P in the transesophageal echocardiography indicated in the display region 75, i.e., the position of an emitting element within the transducer, so as to be recognizable for the operator. For example, in the display region 75, the transducer position P in the transesophageal echocardiography is displayed with a yellow point 75D. Further, in the display region 74, the centerline of the esophagus is displayed with a yellow line 75E (the two-dot chain line in FIG. 6). As explained herein, because the display regions 74 and 75 of the user interface 71 each display the transducer position P in the transesophageal echocardiography and the centerline of the esophagus, the operator is able to understand the transducer position more easily.

Further, on the user interface 71, the sector orientation displayed in the display region 73 is, for example, a parameter indicating the orientation as the sector is rotated in the clockwise direction (toward the right of the chest) or the counterclockwise direction (toward the left of the chest) with respect to a default value. On the user interface 71, the transducer position displayed in the display region 73 is, for example, a parameter indicating that the transducer is advanced or retreated in the esophagus with respect to a default value. When the operator increases the default value of the transducer position, the transducer is advanced in the esophagus. On the contrary, when the operator decreases the default value of the transducer position, the transducer is retreated in the esophagus.

Further, the user interface 71 may display a save button 76. By pressing the save button 76, the operator may save, into the storage circuitry 140, the imaging parameters related to the transesophageal echocardiography imaging such as the MPR cross-sectional plane, the depth and the angle of the sector, and the transducer position estimated by the estimating function 50. For example, after selecting optimal imaging parameters through the user interface 71, the operator may save the optimal imaging parameters into the storage circuitry 140 by pressing the save button 76.

Furthermore, what may be displayed by the user interface 71 is not limited to the above examples. It is also acceptable to display other parameters or details that can be confirmed or adjusted by the operator.

Next, a processing flowchart of processes performed by the image processing apparatus 100 according to the first embodiment will be explained, with reference to FIG. 7. FIG. 7 is a processing flowchart for explaining processes performed by the image processing apparatus according to the first embodiment.

As illustrated in FIG. 7, at step S101, the obtaining function 10 obtains the first image data taken by implementing the first imaging method. The first feature specifying function 20 specifies features related to the first organ in the first image data. For example, the obtaining function 10 obtains a heart CT image taken by implementing a heart CT image imaging method. The first feature specifying function 20 specifies the inner contour and the centerline of the esophagus in the heart CT image as the features related to the first organ. After that, the process proceeds to step S102.

At step S102, the first segmenting function 21 segments the first organ in the first image data, on the basis of the features related to the first organ in the first image data and specified by the first feature specifying function 20. For example, the first segmenting function 21 segments the esophagus in the heart CT image, on the basis of the inner contour and the centerline of the esophagus specified by the first feature specifying function 20. After that, the process proceeds to step S103.

At step S103, the transducer path generating function 22 generates a transducer path corresponding to the second imaging method in the first image data, on the basis of the segmented first organ. For example, on the basis of the segmented esophagus, the transducer path generating function 22 generates, in the heart CT image, the transducer path corresponding to the transesophageal echocardiography imaging method. After that, the process proceeds to step S104.

At step S104, the image converting function 80 processes the brightness values in the first image data, so as to convert the brightness values in the first image data into brightness values corresponding to the second imaging method. For example, the image converting function 80 converts the brightness values in the heart CT image (i.e., the CT image) into brightness values in a medical image (i.e., an ultrasound image) obtained by implementing the transesophageal echocardiography imaging method. After that, the process proceeds to step S105.

At step S105, the receiving function 30 receives an imaged range that is in the second image data to be taken by implementing the second imaging method and is related to the second organ. For example, the receiving function 30 received the imaged range related to the heart corresponding to the transesophageal echocardiography imaging method. After that, the process proceeds to step S106.

At step S106, the second feature specifying function specifies features related to the imaged range of the second organ in the first image data. For example, the second feature specifying function 40 obtains the anatomical features and the algorithm sequences related to the imaged range of the heart in the heart CT image. After that, the process proceeds to step S107.

At step S107, the estimating function 50 estimates the imaging parameters corresponding to the second imaging method to be used at the time of imaging the imaged range related to the second organ, on the basis of the features related to the first organ and the features related to the imaged range of the second organ in the first image data. For example, on the basis of the inner contour and the centerline of the esophagus in the heart CT image and the relevant anatomical features and algorithm sequences, the estimating function 50 estimates the depth and the angle of the sector in the transesophageal echocardiography and the transducer position at the time of imaging the imaged range related to the heart. The process then proceeds to step S108.

At step S108, the display controlling function 70 causes the display 120 to display the imaging parameters corresponding to the second imaging method to be used at the time of imaging the imaged range related to the second organ. For example, the display controlling function 70 causes the display 120 to display the depth and the angle of the sector and the transducer position to be used at the time of performing the transesophageal echocardiography imaging on the imaged range related to the heart.

Alternatively, the process of specifying the feature points at step S101 and/or the process of segmenting the esophagus at step S102 may be performed manually. Further, the feature point specifying process and the esophagus segmentation are means for realizing the transducer path generating process at step S103. Thus, the transducer path generating process at step S103 may be realized by using a result from another means. Further, the transducer path generating process at step S103 does not necessarily have to be realized by using the method described above and may be realized with other methods. Furthermore, the operator may manually create a transducer path.

As explained above, in the image processing apparatus 100 according to the present embodiment, the obtaining function 10 is configured to obtain the first image data (the heart CT image of the patient) taken by implementing the first imaging method (the CT image imaging method). The first feature specifying function 20 is configured to specify the features (the inner contour and the centerline) related to the first organ (the esophagus of the patient) in the first image data. The receiving function 30 is configured to receive the imaged range that is in the second image data (the transesophageal echocardiography (the ultrasound image of the heart of the patient)) to be taken by implementing the second imaging method (the transesophageal echocardiography imaging method) different from the first imaging method and is related to the second organ (the heart of the patient) different from the first organ. The second feature specifying function 40 is configured to specify the features related to the imaged range of the second organ in the first image data. The estimating function 50 is configured to estimate the imaging parameters that correspond to the imaged range of the second organ corresponding to the second imaging method, on the basis of the features related to the first organ and the features related to the imaged range of the second organ in the first image data.

As described herein, the image processing apparatus 100 according to the present embodiment is capable of estimating the imaging parameters corresponding to the second imaging method on the basis of the features related to the first organ (the esophagus of the patient) and the features related to the imaged range of the second organ (the heart of the patient) in the first image data (the heart CT image of the patient). In that situation, when the operator designates the imaged range related to the second organ corresponding to the second imaging method which he/she wishes to image, the image processing apparatus 100 according to the present embodiment is able to automatically estimate the imaging parameters for imaging the imaged range. Consequently, it is possible to reduce the time and labor required of the operator and to enhance work efficiency. It is therefore possible to efficiently provide the operator with a pre-procedure plan.

In addition, the image processing apparatus 100 according to the present embodiment is configured to obtain the first image data corresponding to the first imaging method and to estimate the imaging parameters corresponding to the second imaging method on the basis of the first image data. In this manner, it is possible to obtain the first image data (the heart CT image) of the patient and to estimate the imaging parameters. Accordingly, it is possible to estimate the imaging parameters while taking differences among different patients into consideration. It is therefore possible to apply the estimated imaging parameters to other purposes such as clinical surgery. It is therefore possible to precisely provide the operator with a pre-procedure plan.

Furthermore, with the image processing apparatus 100 according to the present embodiment, by referring to the imaging parameters that correspond to the second imaging method and are estimated before a medical procedure, the operator is able to easily implement the second imaging method during the medical procedure where a medical image is taken by implementing the second imaging method. In other words, because the estimated imaging parameters corresponding to the second imaging method are easily reproduced during the medical procedure, it is possible to assist the acquisition of the appropriate medical images.

Further, in the image processing apparatus 100 according to the present embodiment, the template storage unit 60 is configured to store therein the template indicating the features related to the imaged range of the second organ (the heart of the patient). On the basis of the imaged range of the second organ (the heart of the patient) received by the receiving function 30, the second feature specifying function 40 is configured to specify the features related to the imaged range of the second organ from the template stored in the template storage unit 60. In this situation, the template stored in the template storage unit 60 includes the information indicating the view names corresponding to the second imaging method (the transesophageal echocardiography imaging method), the information indicating the anatomical features corresponding to the view names, and the information indicating the algorithm sequences for extracting the anatomical features.

As explained above, in the image processing apparatus 100 according to the present embodiment, the view names, the anatomical features, and the algorithm sequences corresponding to the second imaging method are stored in advance in the template in the template storage unit 60 while being kept in correspondence with one another. Accordingly, when the operator designates one of the view names corresponding to the second imaging method which he/she wishes to image, the image processing apparatus 100 according to the present embodiment is configured to obtain the anatomical features and the algorithm sequences corresponding to the view name. Consequently, on the basis of the anatomical features and the algorithm sequences, the image processing apparatus 100 according to the present embodiment is able to estimate (simulate) the medical image regarding results of the second imaging method having the view name designated in the first image data and to estimate the imaging parameters required at the time of implementing the second imaging method for which the view name was designated. With reference to the estimation results and the imaging parameters for the second imaging method prior to the medical procedure, the image processing apparatus 100 according to the present embodiment makes it possible to guide imaging operations to be performed by the operator during the medical procedure. As explained herein, it is possible to provide the operator with a pre-procedure plan and the during-procedure guidance more efficiently and more precisely.

Further, in the image processing apparatus 100 according to the present embodiment, the image converting function 80 is configured to process the brightness values in the first image data (the heart CT image), so as to convert the brightness values corresponding to the first imaging method (the CT image imaging method) into the brightness values corresponding to the second imaging method (the transesophageal echocardiography imaging method). Accordingly, by using the first image data, the image processing apparatus 100 in the present embodiment is able to estimate the medical image regarding the results of the second imaging method which the operator wishes to implement. By displaying the information for the operator before the medical procedure, it is possible to have the operator understand the estimation results of the second imaging method which the operator wishes to implement. As explained herein, it is possible to provide the operator with a pre-procedure plan more efficiently and more precisely.

Further, in the image processing apparatus 100 according to the present embodiment, the first segmenting function 21 is configured to segment the first organ in the first image data, on the basis of the features (the inner contour and the centerline of the esophagus) related to the first organ (the esophagus of the patient) in the first image data (the heart CT image of the patient) and specified by the first feature specifying function 20. On the basis of the segmented first organ, the transducer path generating function 22 is configured to generate, in the first image data, the transducer path for imaging the second organ (the heart of the patient) by implementing the second imaging method (the transesophageal echocardiography imaging method).

As explained above, the image processing apparatus 100 according to the first embodiment is able to segment the first organ in the first image data and to generate the transducer path on the basis of the first organ. In other words, before the medical procedure, it is possible to provide the operator with the path on which the transducer is able to move, so that the operator is able to easily manipulate the transducer during the medical procedure. In this manner, it is possible to further provide the operator with a pre-procedure plan efficiently and precisely.

In addition, in the image processing apparatus 100 according to the present embodiment, the imaging parameters include the position of the transducer (the transducer position P) and the depth and the angle of the sector for specifying the imaged range of the second organ (the heart of the patient) corresponding to the second imaging method (the transesophageal echocardiography imaging method).

As explained herein, on the basis of the estimated imaging parameters, the image processing apparatus 100 according to the present embodiment is configured, before the medical procedure, to provide the operator with the imaging parameters required at the time of implementing the second imaging method such as the transducer position, the depth of the sector, and the angle of the sector. Accordingly, the operator is able to easily perform the imaging operation during the medical procedure. In this manner, it is possible to provide the operator with a pre-procedure plan more efficiently and more precisely.

Furthermore, in the image processing apparatus 100 according to the present embodiment, the cross-section generating function 51 included in the estimating function 50 is configured to generate the first cross-sectional plane (the MPR cross-sectional plane) corresponding to the imaged range of the second organ, on the basis of the features related to the imaged range of the second organ (the heart of the patient) and specified by the second feature specifying function 40. The transducer position estimating function 52 is configured to estimate the position of the transducer (the transducer position P), on the basis of the features (the inner contour and the centerline of the esophagus) related to the first organ (the esophagus of the patient) specified by the first feature specifying function 20 and the first cross-sectional plane generated by the cross-section generating function 51. The sector estimating function 53 is configured to estimate, at the transducer position on the first cross-sectional plane, the depth and the angle of the sector on the basis of the features related to the imaged range of the second organ.

In this situation, as the features related to the imaged range of the second organ (the heart of the patient), the cross-section generating function 51 is configured to specify the anatomical features in the first image data (the heart CT image of the patient), on the basis of the algorithm sequences for extracting the anatomical features and to further generate the first cross-sectional plane (the MPR cross-sectional plane) on the basis of the anatomical features. Further, the features related to the first organ (the esophagus of the patient) include the centerline and the inner contour of the first organ, so that the transducer position estimating function 52 estimates the intersection point between the centerline of the first organ and the first cross-sectional plane (the MPR cross-sectional plane) as the transducer position. Further, as the features related to the imaged range of the second organ (the heart of the patient), the sector estimating function 53 is configured to estimate, on the basis of the anatomical features, the depth and the angle of the sector in such a manner that the sector includes all the anatomical features, while the area of the sector is minimized.

As explained above, in the image processing apparatus 100 according to the present embodiment, the cross-section generating function 51 included in the estimating function 50 is configured, when the operator has designated one of the view names in the transesophageal echocardiography, to extract (segment/detect) the anatomical features in the heart CT image on the basis of the applicable algorithm sequences, and to further generate the MPR cross-sectional plane on the basis of the anatomical features. In that situation, the MPR cross-sectional plane serves as a medical image for carrying out the estimation (simulation) regarding the transesophageal echocardiography designated on the basis of the heart CT image. Accordingly, before the medical procedure, it is possible to provide the operator with a pre-procedure plan efficiently, by using the medical image for carrying out the estimation regarding the designated transesophageal echocardiography.

Further, regardless of being experienced or not, the operator is able to reproduce the transesophageal echocardiography corresponding to the estimation results and the imaging parameters during the medical procedure, on the basis of the provided estimation results and the estimated imaging parameters. Consequently, the operator is able to easily perform the transesophageal echocardiography imaging process.

In the present embodiment, the template stored in the template storage unit 60 is provided, and the template may be corrected in a self-adaptive manner on the basis of actual clinical experiences. Consequently, it is possible to apply the image processing apparatus and the image processing method of the present embodiment to a new patient.

Modification Example of First Embodiment

Next, a modification example of the first embodiment will be explained with reference to FIGS. 8 and 9. In the following sections, only differences between the modification example and the first embodiment will be explained. Some of the constituent elements that are the same or similar will be referred to by using the same reference characters, and duplicate explanations will be omitted as appropriate.

Figure 8:
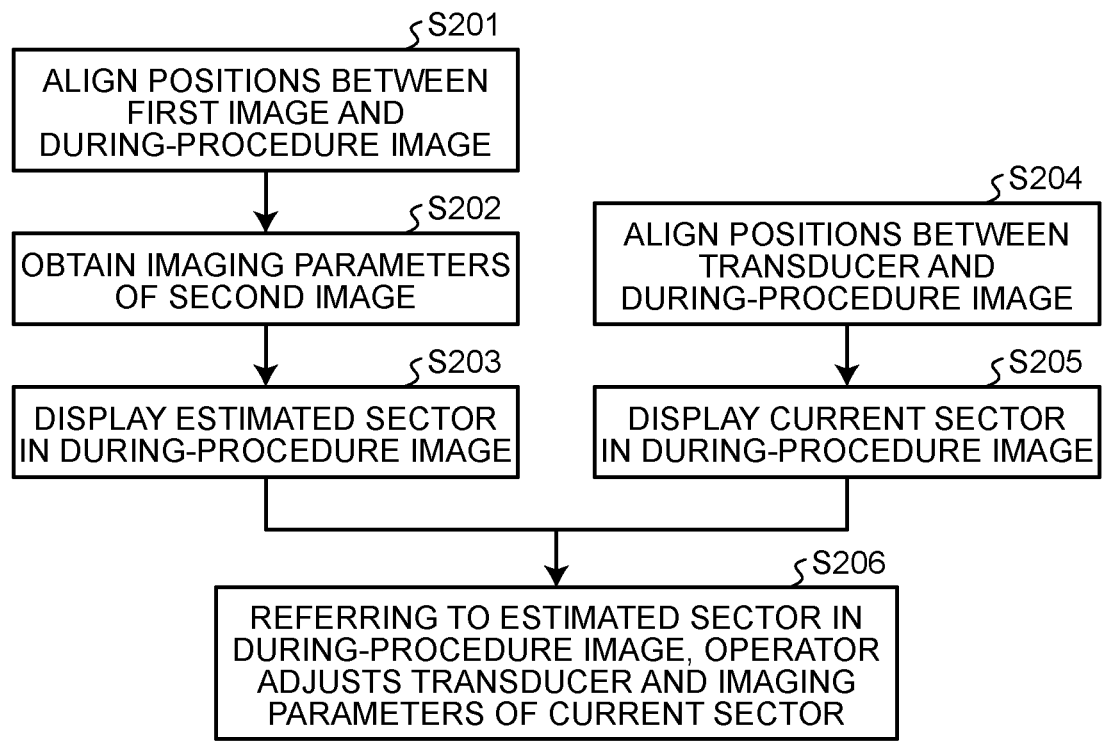
FIG. 8 is a flowchart for explaining processes performed by a display controlling function according to a modification example of the first embodiment.

FIG. 8 is a flowchart for explaining processes performed by the display controlling function 70 according to the modification example of the first embodiment. FIG. 9 is a schematic drawing illustrating an example of a during-procedure image according to the modification example of the first embodiment.

Figure 9:
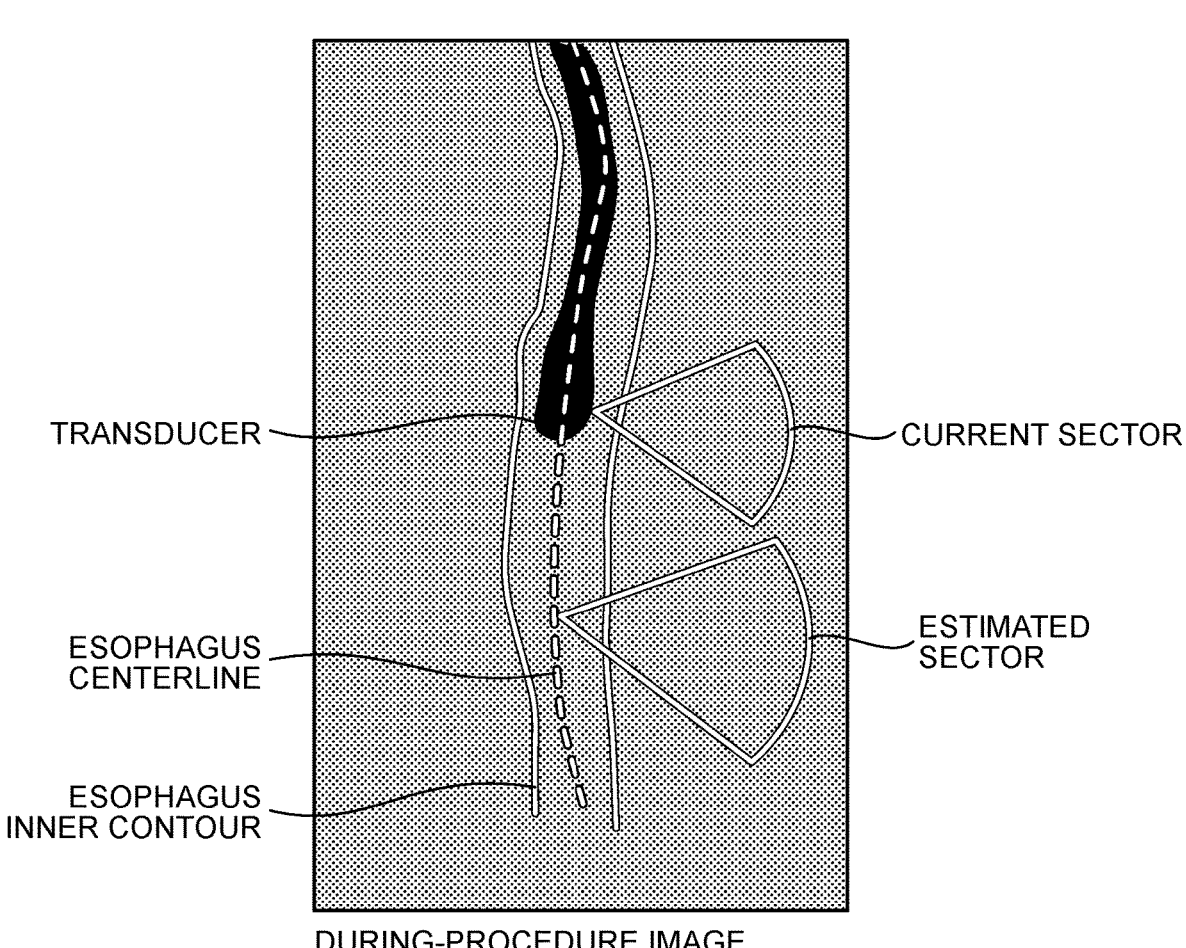
FIG. 9 is a schematic drawing illustrating an example of a during-procedure image according to a modification example of the first embodiment.

As illustrated in FIG. 9, the display controlling function 70 of the image processing apparatus 100 according to the modification example of the first embodiment is configured, on the basis of the imaging parameters estimated by the estimating function 50, to cause the display 120 to display, in the during-procedure image, an estimated sector being a sector corresponding to the imaging parameters. In addition, the display controlling function 70 is configured to cause the display 120 to display a sector at present (hereinafter, "current sector") on the basis of the position and the orientation of the transducer at present. Further, the display controlling function 70 is configured to guide operations performed by the operator in relation to adjusting the current transducer position and the imaging parameters, so as to be able to match the current sector with the estimated sector. In this situation, the display controlling function 70 is an example of a "guiding unit".

More specifically, the display controlling function 70 is configured to display an applicable estimated sector in a during-procedure image of the transesophageal echocardiography, on the basis of the transducer position P and the depth and the angle of the sector which are the imaging parameters estimated by the estimating function 50. After that, in an image taken during the medical procedure, the display controlling function 70 is configured to display the current sector in a real-time manner, on the basis of the current transducer position and the current orientation. As a result of the display controlling function 70 causing the display 120 to display the current sector and the estimated sector in this manner, the operator is able, by referring to the estimated sector, to compare the estimated sector with the current sector when performing operations during the medical procedure of the transesophageal echocardiography. In addition, by causing the display 120 to display the current sector and the estimated sector, the display controlling function 70 is configured to guide operations performed by the operator on the transducer, so as to be able to match the current sector with the estimated sector.

In this situation, the estimated sector is a sector based on the transducer position P and the angle and the depth of the sector that were estimated by the estimating function 50. The current sector is a sector corresponding to the position in which the transducer is currently placed and to the imaging parameters that are currently set, during the medical procedure of the transesophageal echocardiography. Further, the image taken during the medical procedure of the transesophageal echocardiography and the during-procedure image denote the medical image taken in a real-time manner for the purpose of checking the transducer position or the like during the medical procedure of the transesophageal echocardiography and may be a CT image, for example.

Further, when the operator has selected and saved, through the user interface 71, optimal imaging parameters for performing the transesophageal echocardiography imaging, the display controlling function 70 may display an estimated sector on the basis of the saved optimal imaging parameters.

As a result, on the basis of the orientations, the depths, and the angles of the current sector and the estimated sector displayed in the real-time manner, the operator is able to specify a transducer position and an orientation by comparing the current sector with the estimated sector for the differences. In addition, the operator is able to adjust the imaging parameters of the sector and to adjust the transducer position or the like, so as to be able to make the current sector approach or match the estimated sector. As explained herein, by guiding the operations performed by the operator on the current transducer and the settings of the imaging parameters, the display controlling function 70 is able to enhance efficiency in the operations and to have the operations performed more precisely.

With reference to FIG. 8, a flowchart of processes performed by the display controlling function 70 according to the modification example of the first embodiment will be explained.

As illustrated in FIG. 8, at step S201, the display controlling function 70 aligns positions between the first image data and the during-procedure image. For example, the display controlling function 70 is configured to align positions between the heart CT image and the transesophageal echocardiography during-procedure image, by using a publicly-known position aligning method. After that, the process proceeds to step S202.

At step S202, the display controlling function 70 obtains the imaging parameters corresponding to the second imaging method. For example, the display controlling function 70 obtains the imaging parameters in the transesophageal echocardiography estimated by the estimating function 50. Alternatively, the display controlling function 70 may obtain the optimal imaging parameters selected and saved by the operator via the user interface 71. After that, the process proceeds to step S203.

At step S203, the display controlling function 70 displays an estimated sector within the during-procedure image, on the basis of the obtained imaging parameters. For example, on the basis of the imaging parameters estimated by the estimating function 50, the display controlling function 70 may display the estimated sector corresponding to the imaging parameters, in the during-procedure image. Alternatively, on the basis of the optimal imaging parameters saved by the operator, the display controlling function 70 may display the estimated sector corresponding to the imaging parameters in the during-procedure image. It is sufficient when the estimated sector is a sector that makes it possible to guide operations performed by the operator on the transducer and settings of the imaging parameters.

Subsequently, at step S204, the display controlling function 70 aligns the positions between the transducer and the during-procedure image. For example, the display controlling function 70 aligns the positions between the transducer and the during-procedure image in a real-time manner during the medical procedure. After that, the process proceeds to step S205.

At step S205, the display controlling function 70 displays the current sector in the during-procedure image. For example, the current sector is a sector based on the transducer position and the imaging parameters during the medical procedure. The operator is able to change the current sector during the medical procedure by moving the transducer or adjusting the imaging parameters. After that, the process proceeds to step S206.

At step S206, the operator refers to the estimated sector in the during-procedure image and adjusts the imaging parameters of the current transducer and the current sector. For example, by referring to the estimated sector in the during-procedure image, the operator adjusts the transducer position, the imaging parameters, and the like, so that the current sector approaches and overlaps with the estimated sector, while using the estimated sector as a goal.

As explained above, in the image processing apparatus 100 according to the modification example of the present embodiment, the display controlling function 70 is configured, in the during-procedure image, to display the estimated sector which is the sector corresponding to the imaging parameters on the basis of the imaging parameters estimated by the estimating function 50 and to further display the current sector on the basis of the current position and orientation of the transducer. Further, the display controlling function 70 is configured to guide the operations performed by the operator related to adjusting the current transducer position and the imaging parameters, so as to be able to match the current sector with the estimated sector.

In this manner, the image processing apparatus 100 according to the modification example of the present embodiment is able to display, in the real-time manner, the current transducer position, the estimated sector, and the current sector during the medical procedure. Accordingly, the operator is able, during the medical procedure, to specify the transducer position and orientation, by comparing the current sector with the estimated sector for the differences therebetween, on the basis of the orientations, the depths, and the angles, or the like of the current sector and the estimated sector displayed in the real-time manner. In addition, the operator is able to adjust the imaging parameters of the sector or the transducer position so that the current sector approaches the estimated sector. As explained herein, the image processing apparatus 100 according to the modification example of the present embodiment is configured to guide the operations performed by the operator on the transducer and the settings of the imaging parameters. It is therefore possible to enhance efficiency in the operations and to have the operations performed more precisely.

Further, during the medical procedure, the operator is able to adjust the transducer position, the imaging parameters, and the like in the visible manner and to observe, in the real-time manner, the differences between the current sector and the estimated sector. It is therefore possible to adjust the transducer position and the imaging parameters so that the current sector approaches the estimated sector. Accordingly, regardless of being experienced or not, the operator is able to optimally set the transducer position and the imaging parameters easily during the medical procedure. In other words, it is possible to visualize the operations on the transducer during the medical procedure and to precisely instruct the operator during the medical procedure.

Second Embodiment

Next, a second embodiment will be explained, with reference to FIGS. 10 and 11. In the following sections, differences between the second embodiment and the first embodiment will be explained. Some of the constituent elements that are the same or similar will be referred to by using the same reference characters, and duplicate explanations will be omitted as appropriate.

Figure 10:
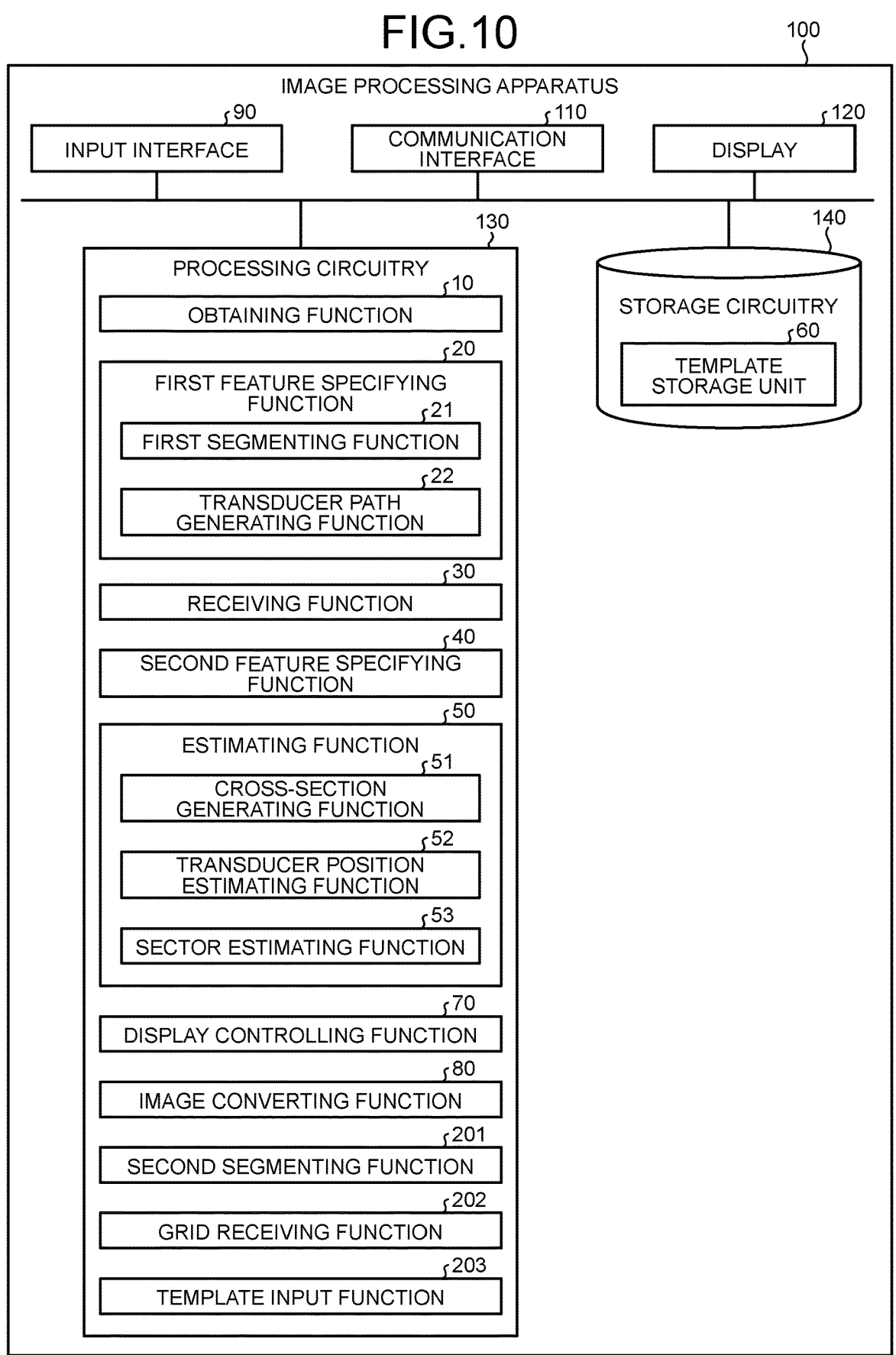
FIG. 10 is a block diagram illustrating an exemplary functional configuration of an image processing apparatus according to a second embodiment.

FIG. 10 is a block diagram illustrating an exemplary functional configuration of an image processing apparatus according to the second embodiment. FIG. 11 is a schematic drawing illustrating an example in which anatomical features are received according to the second embodiment.

As illustrated in FIG. 10, a difference between the second embodiment and the first embodiment lies in that the processing circuitry 130 of an image processing apparatus 100 according to the second embodiment further includes a second segmenting function 201, a grid receiving function 202, and a template input function 203.

The second segmenting function 201 is configured to segment the second organ into grid sections on the basis of the first image data. In this situation, the second segmenting function 201 is an example of a "second segmenting unit".

More specifically, for example, the structure of the heart includes the valves, the endocardia, the epicardium, the veins, the aortic root part, and the like. The second segmenting function 201 is configured, on the basis of the heart CT image, to segment the heart according to the various constituent parts and to display segmented results as the prescribed grid sections. In this situation, the grid sections are represented by grid points of which the quantity and the arrangements are confirmed in advance. A unique identifier corresponds to each of the grid points. Correspondence relationships between the identifiers and the grid points are used for searching for any of the grid points. In that situation, the grid position of a grid section in a patient's data corresponds to a feature point position of an anatomical feature. Also, mutually the same grid point corresponds to mutually the same anatomical feature.

The grid receiving function 202 is configured to receive the grid position of a designated grid section. In this situation, the grid receiving function 202 is an example of a "grid receiving unit".

More specifically, for example, the operator designates a grid position in the grid, via the user interface 71 or the input interface 90. The grid receiving function 202 is configured to receive the grid position designated by the operator.

The template input function 203 is configured to store the received grid position as an anatomical feature, into the template in the template storage unit 60. In this situation, the template input function 203 is an example of a "template input unit".

More specifically, the template input function 203 is configured to store the anatomical feature corresponding to the grid position received by the grid receiving function 202, into the transesophageal echocardiography template in the template storage unit 60.

For example, when the operator has designated three grid positions such as (100,30), (110,50), and (120,60) in the grid representing an image of which the view name is an "ME, AV, SAX (Midoesophageal short axis view of the aortic valve)" view, the grid receiving function 202 is configured to receive the grid positions and correspondence relationships between the grid positions and the view name. The template input function 203 is configured, as illustrated in FIG. 11, to store the received grid positions as anatomical features into the template in the template storage unit 60 so as to be kept in correspondence with the corresponding view name. In the example in FIG. 11, information "ME, AV, SAX" indicating the view name, information "(100,30), (110,50), and (120,60)" indicating the anatomical features, and "Not Applicable (N/A)" serving as information indicating algorithm sequences are stored while being kept in correspondence with one another, as the template in the template storage unit 60.

A flow in processes according to the second embodiment will be explained, with reference to FIG. 12.

FIG. 12 is a flowchart for explaining the processes performed by the image processing apparatus according to the second embodiment.

As illustrated in FIG. 12, at step S301, the obtaining function 10 obtains the first image data. After that, the process proceeds to step S302.

At step S302, the second segmenting function 201 segments the second organ into grid sections, on the basis of the first image data. For example, the second segmenting function 201 segments the heart into the grid sections, on the basis of the heart CT image. After that, the process proceeds to step S303.

At step S303, the grid receiving function 202 receives the grid positions of the designated grid sections. After that, the process proceeds to step S304.

At step S304, the template input function 203 inputs and stores the received grid positions as the anatomical features, into the template in the template storage unit 60. For example, the template input function 203 inputs and stores the three received grid positions such as (100,30), (110,50), and (120,60) as the anatomical features, into the template in the template storage unit 60. As a result, the template has input therein the anatomical features corresponding to the grid positions designated by the operator and the view name corresponding to the anatomical features, or the like.

As explained above, in the image processing apparatus 100 according to the present embodiment, the second segmenting function 201 is configured, on the basis of the first image data (the heart CT image of the patient), to segment the second organ (the heart of the patient) into the grid sections. The grid receiving function 202 is configured to receive the grid positions of the designated grid sections. The template input function 203 is configured to input the grid positions as the anatomical features, into the template stored in the template storage unit 60. The estimating function 50 is configured to estimate imaging parameters on the basis of the input anatomical features.

As explained above, in the image processing apparatus 100 according to the present embodiment, the second feature specifying function 40 is configured, when the receiving function 30 receives the imaged range related to the second organ, to specify the features related to the imaged range of the second organ, on the basis of the anatomical features corresponding to the grid positions designated by the operator. After that, on the basis of the anatomical features corresponding to the grid positions designated by the operator, the estimating function 50 is configured to estimate the imaging parameters corresponding to the imaged range related to the second organ in the second image data.

Consequently, the image processing apparatus 100 according to the present embodiment is able to estimate the medical image to be taken with the transesophageal echocardiography and the imaging parameters, on the basis of the anatomical features corresponding to the grid positions designated by the operator. Accordingly, in accordance with demand of the operator, it is possible to provide the operator with a pre-procedure plan even more efficiently and precisely.

Third Embodiment

Next, a third embodiment will be explained, with reference to FIGS. 13 and 14. In the following sections, only differences between the third embodiment and the first embodiment will be explained. Some of the constituent elements that are the same or similar will be referred to by using the same reference characters, and duplicate explanations will be omitted as appropriate.

Figure 13:
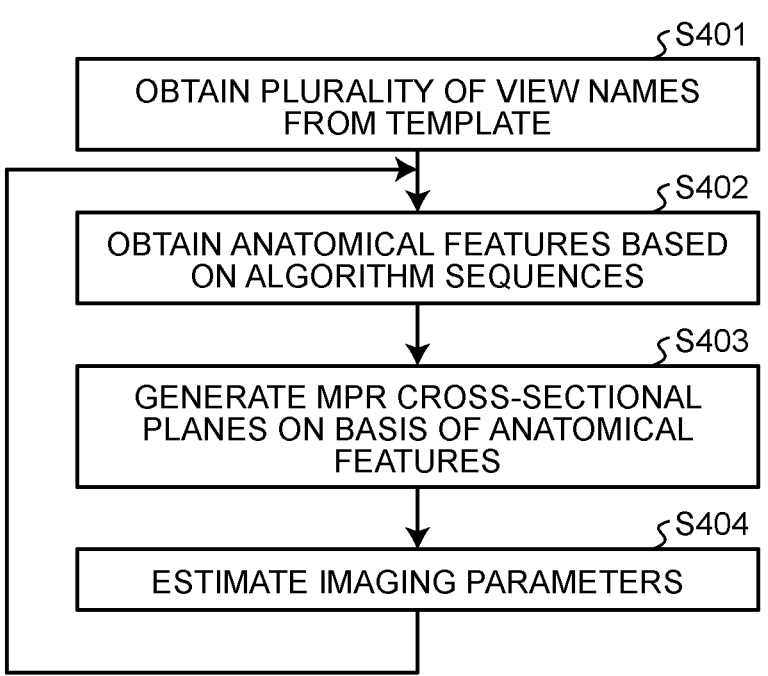
FIG. 13 is a flowchart for explaining processes performed by an image processing apparatus according to a third embodiment.

FIG. 13 is a flowchart for explaining processes performed by an image processing apparatus according to the third embodiment. FIG. 14 is a partial schematic drawing illustrating an example of a user interface according to the third embodiment.

A difference between the third embodiment and the first embodiment lies in that the receiving function 30 does not receive the imaged range related to the second organ, whereas the estimating function 50 is configured, on the basis of features related to a plurality of imaged ranges of the second organ in a template, to estimate each of the corresponding imaging parameters. Further, on the user interface 71, the display controlling function 70 is configured to display a plurality of generated MPR cross-sectional planes and the estimated imaging parameters.

As illustrated in FIG. 13, at step S401, the second feature specifying function 40 obtains two or more of the view names stored in the template storage unit 60 and applicable anatomical features and algorithm sequences. After that, the process proceeds to step S402.

At step S402, with respect to one of the view names, the estimating function 50 specifies anatomical features by using applicable algorithm sequences. After that, the process proceeds to step S403.

At step S403, the cross-section generating function 51 of the estimating function 50 generates an MPR cross-sectional plane on the basis of the anatomical features. After that, the process proceeds to step S404.

At step S404, the sector estimating function 53 of the estimating function 50 estimates imaging parameters.

Subsequently, the process returns to step S402 where the estimating function 50 continues to generate an MPR cross-sectional plane and to estimate imaging parameters with respect to the next view name.

In this situation, because the operations of the estimating function 50 are the same as those in the first embodiment, detailed explanations thereof will be omitted.

Figure 14:
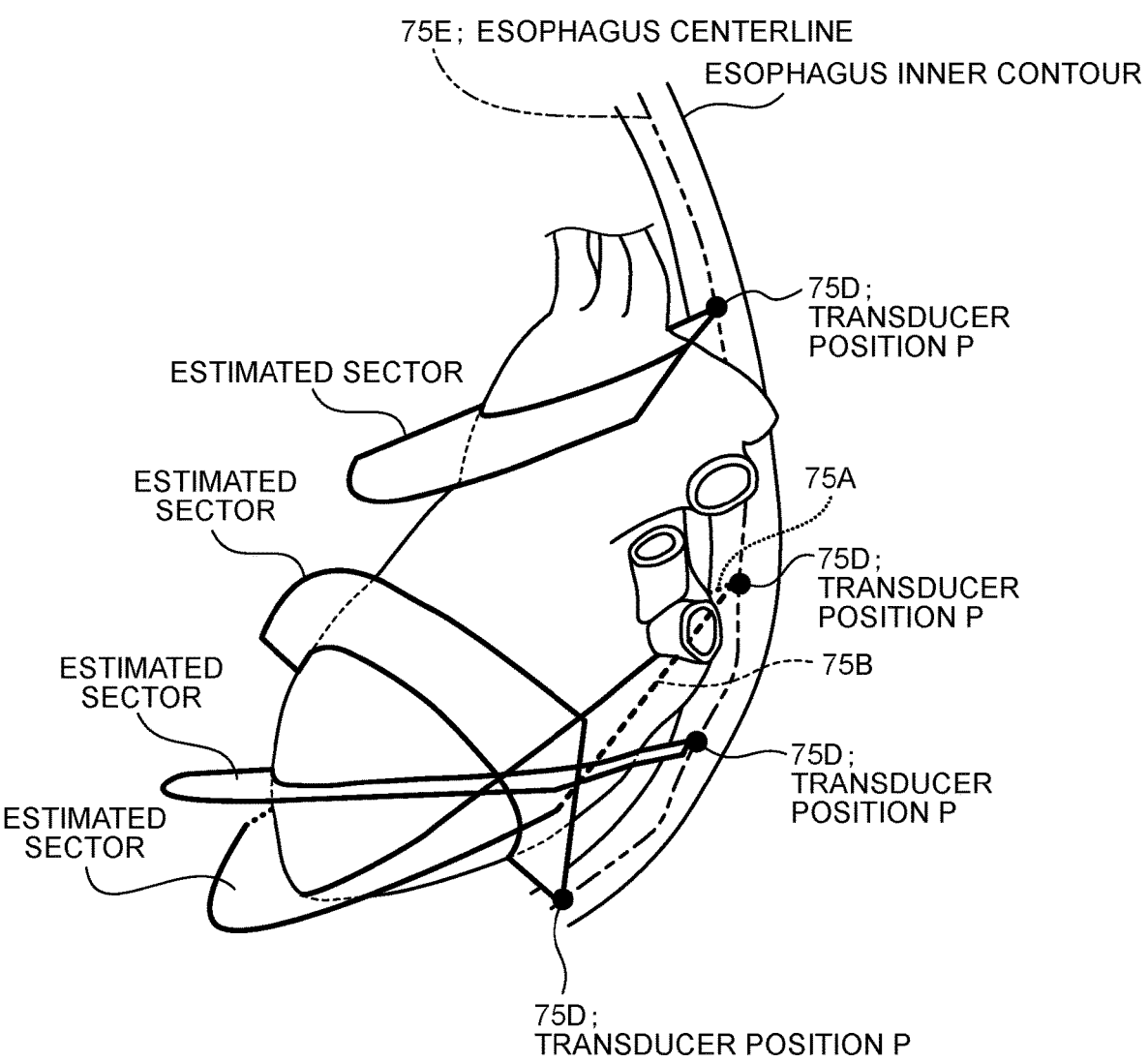
FIG. 14 is a partial schematic drawing illustrating an example of a user interface according to the third embodiment.

As illustrated in FIG. 14, as for the display controlling function 70, the user interface 71 includes, for example, the plurality of generated MPR cross-sectional planes and the estimated imaging parameters. In the example in FIG. 14, in a heart model displayed on the user interface 71, the display controlling function 70 is configured to display the inner contour and the centerline of the esophagus specified by the first feature specifying function 20. Further, the display controlling function 70 is also configured to display four transducer positions P estimated by the transducer position estimating function 52 and four sectors estimated by the sector estimating function 53. More specifically, for example, in the heart model, the two radii of a sector selected by the operator are displayed with a red line 75A (the dotted line in FIG. 14) and with a green line 75B (the broken line in FIG. 14). Further, the transducer positions P in the transesophageal echocardiography are displayed with yellow dots 75D. The centerline of the esophagus is displayed with a yellow line 75E (the two-dot chain line in FIG. 14).

As explained above, in the image processing apparatus 100 according to the present embodiment, the estimating function 50 is configured to estimate each of the corresponding imaging parameters, on the basis of the features related to the plurality of imaged ranges of the second organ (the heart of the patient) in the template.

As described herein, the image processing apparatus 100 according to the present embodiment is able to simultaneously display, for the operator, the MPR cross-sectional planes and the imaging parameters corresponding to the plurality of transesophageal echocardiography view names. The operator is able to obtain the information about the plurality of imaging parameters simultaneously, to select the imaging parameters corresponding to the transesophageal echocardiography imaging to be performed from within the obtained information, or to select the imaging parameters of the sites of the heart to be imaged by the MPR cross-sectional planes and the estimated sectors. In this manner, it is possible to present the operator with a pre-procedure plan efficiently and precisely.

Further, in the first to the third embodiments described above, the image processing apparatuses and the image processing methods were explained by using the examples of the transesophageal echocardiography. However, possible embodiments of the present disclosure are not limited to these examples. For instance, the image processing apparatus and the image processing method according to an embodiment of the present disclosure may be applied to intra-vascular endoscopy or Intra Cardiac Echo Catheter (ICE).

Further, in the first to the third embodiments described above, the examples were explained in which the first imaging method is the CT imaging method; the second imaging method is the transesophageal echocardiography imaging method; the first image data is the CT image; and the second image data is the ultrasound image. However, possible embodiments of the present disclosure are not limited to those examples. For instance, the first imaging method may be a Magnetic Resonance Imaging (MRI) method, whereas the second imaging method may be an angiography imaging method. In that situation, the first image data is an MRI image, whereas the second image data is an angiography image. In another example, the first imaging method may be a CT imaging method, whereas the second imaging method may be an angiography imaging method.

Further, in the first to the third embodiments described above, the example was explained in which the first organ is the esophagus, whereas the second organ is the heart. However, possible embodiments of the present disclosure are not limited to this example. For instance, the first organ and the second organ may be other organs of the patient.

Further, it is possible to apply the image processing apparatuses and the image processing methods in the present embodiments to an arbitrary medical image, as long as there is a correspondence relationship between the first image data based on the first imaging method and the second image data based on the second imaging method, while the imaged range and the imaging parameters corresponding to the second imaging method are changeable in an imaging process implementing the second imaging method.

Further, in the first to the third embodiments described above, the example was explained in which the method for segmenting the organ in the image data uses a three-dimensional convolution neural network, a random walk technique, classic binarization processing, graph cut processing, or the like. However, possible embodiments of the present disclosure are not limited to these examples. For instance, it is possible to use arbitrary processing methods, as long as it is possible to specify the position of a target organ in an image.

The constituent elements of the apparatuses in the embodiments described above are based on functional concepts. Thus, it is not necessarily required to physically configure the constituent elements as indicated in the drawings. In other words, distributing/integrative specific modes of the apparatuses are not limited to those illustrated in the drawings. It is acceptable to functionally or physically adopt any distributing or integrative configurations in all or a part of the apparatuses in any arbitrary units, depending on various loads and the status of use. Further, in any of the apparatuses, all or an arbitrary part of the processing functions may be realized with a CPU and a program analyzed and executed by the CPU or may be realized as hardware based on wired logic.

Further, the image processing apparatuses and the image processing methods explained in the above embodiments may be realized by causing a computer such as a personal computer or a workstation to execute a program prepared in advance. The program may be distributed via a cyber element such as the Internet. Further, the program may be recorded on a non-transitory computer-readable recording medium such as a hard disk, a floppy disk (FD), a Compact Disk Read-Only Memory (CD-ROM), a Magneto-Optical (MO) disk, a Digital Versatile Disk (DVD), or the like, so as to be executed as being read from the recording medium by a computer.

According to at least one aspect of the embodiments described above, it is possible to assist the acquisition of the appropriate medical images.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without depart-ing from the spirit of the inventions. The accompanying claims and their equivalents are intended to cover such forms or modifications as would fall within the scope and spirit of the inventions.

What is claimed is:

1. An image processing apparatus comprising processing circuitry configured:

to obtain first image data taken by implementing a first imaging method;

to specify a feature related to a first organ in the first image data;

to receive an imaged range that is in second image data to be taken by implementing a second imaging method different from the first imaging method and is related to a second organ different from the first organ;

to specify a feature related to the imaged range of the second organ in the first image data; and to estimate an imaging parameter that corresponds to the imaged range of the second organ corresponding to the second imaging method, on a basis of the feature related to the first organ and the feature related to the imaged range of the second organ in the first image data.

2. The image processing apparatus according to claim 1, further comprising:

storage circuitry having stored therein a template indicat-ing the feature related to the imaged range of the second organ, wherein on a basis of the received imaged range of the second organ, the processing circuitry is configured to specify the feature related to the imaged range of the second organ, from the template stored in the storage circuitry.

3. The image processing apparatus according to claim 2, wherein the template stored in the storage circuitry includes information indicating a view name corresponding to the second imaging method, information indicating an anatomi-cal feature corresponding to the view name, and information indicating an algorithm sequence for extracting the anatomi-cal feature.

4. The image processing apparatus according to claim 1, wherein the processing circuitry is configured to process a brightness value in the first image data so as to convert a brightness value corresponding to the first imaging method into a brightness value corresponding to the second imaging method.

5. The image processing apparatus according to claim 1, wherein the processing circuitry is configured to segment the first organ in the first image data, on a basis of the specified feature related to the first organ in the first image data, and on a basis of the segmented first organ, the processing circuitry is configured to generate, in the first image data, a path of a transducer used for imaging the second organ by implementing the second imaging method.

6. The image processing apparatus according to claim 5, wherein the imaging parameter includes a position of the transducer and a depth and an angle of a sector for speci-fying the imaged range of the second organ corresponding to the second imaging method.

7. The image processing apparatus according to claim 6, wherein the processing circuitry is configured to generate a first cross-sectional plane corresponding to the imaged range of the second organ, on a basis of the specified feature related to the imaged range of the second organ, the processing circuitry is configured to estimate the position of the transducer on a basis of the specified feature related to the first organ and the generated first cross-sectional plane, and the processing circuitry is configured to estimate the depth and the angle of the sector in the position of the transducer on the first cross-sectional plane, on a basis of the feature related to the imaged range of the second organ.

8. The image processing apparatus according to claim 7, wherein the processing circuitry is configured to specify, as the feature related to the imaged range of the second organ, an anatomical feature in the first image data, on a basis of an algorithm sequence for extracting the anatomical feature and to further generate the first cross-sectional plane on a basis of the anatomical feature.

9. The image processing apparatus according to claim 7, wherein the feature related to the first organ includes a centerline and an inner contour of the first organ, and the processing circuitry is configured to estimate an intersection point between the centerline of the first organ and the first cross-sectional plane, as the position of the transducer.

10. The image processing apparatus according to claim 7, wherein, as the feature related to the imaged range of the second organ, the processing circuitry is configured, on a basis of anatomical features, to estimate the depth and the angle of the sector so that the sector includes all the anatomical features, while an area of the sector is mini-mized.

11. The image processing apparatus according to claim 10, wherein the processing circuitry is configured, on a basis of the estimated imaging parameter, to display, in a during-procedure image, an estimated sector being the sector cor-responding to the imaging parameter, to also display a current sector on a basis of a current position and a current orientation of the transducer, and to guide an operation performed by the operator in relation to adjusting the current position of the transducer and the imaging parameter, so as to be able to match the current sector with the estimated sector.

12. The image processing apparatus according to claim 3, wherein the processing circuitry is configured:

to segment the second organ into grid sections on a basis of the first image data;

to receive a grid position of a designated one of the grid sections;

to input the grid position as an anatomical feature into the template stored in the storage circuitry; and to estimate the imaging parameter on a basis of the input anatomical feature.

13. The image processing apparatus according to claim 3, wherein, on a basis of features related a plurality of imaged ranges of the second organ in the template, the processing circuitry is configured to estimate each of corresponding imaging parameters.

14. An image processing method comprising:

a first image obtaining step of obtaining first image data taken by implementing a first imaging method;

a first feature specifying step of specifying a feature related to a first organ in the first image data;

a receiving step of receiving an imaged range that is in second image data to be taken by implementing a second imaging method different from the first imaging method and is related to a second organ different from the first organ;

a second feature specifying step of specifying a feature related to the imaged range of the second organ in the first image data; and an estimating step of estimating an imaging parameter that corresponds to the imaged range of the second organ corresponding to the second imaging method, on a basis of the feature related to the first organ and the feature related to the imaged range of the second organ in the first image data.

* * * * *